US008683025B2

(12) United States Patent
Minato

(10) Patent No.: US 8,683,025 B2
(45) Date of Patent: Mar. 25, 2014

(54) METHOD FOR MANAGING STORAGE SYSTEM

(75) Inventor: Hideki Minato, Kawasaki (JP)

(73) Assignee: Hitachi, Ltd., Tokyo (JP)

( * ) Notice: Subject to any disclaimer, the term of this patent is extended or adjusted under 35 U.S.C. 154(b) by 984 days.

(21) Appl. No.: 12/176,712

(22) Filed: Jul. 21, 2008

(65) Prior Publication Data

US 2009/0307341 A1    Dec. 10, 2009

(30) Foreign Application Priority Data

Jun. 4, 2008  (JP) ................................. 2008-146393

(51) Int. Cl.
G06F 15/173        (2006.01)

(52) U.S. Cl.
USPC ........................................................ 709/223

(58) Field of Classification Search
USPC ........................................................ 709/223
See application file for complete search history.

(56) References Cited

U.S. PATENT DOCUMENTS

| 6,311,257 B1 * | 10/2001 | Fitzgerald et al. ............ 711/170 |
| 2004/0193827 A1 * | 9/2004 | Mogi et al. .................... 711/170 |
| 2005/0015475 A1 * | 1/2005 | Fujita et al. ................... 709/223 |
| 2005/0223138 A1 * | 10/2005 | Shiraki et al. .................. 710/36 |
| 2005/0262386 A1 | 11/2005 | Numanoi |
| 2005/0268152 A1 * | 12/2005 | Yamaguchi et al. .............. 714/4 |
| 2006/0206638 A1 * | 9/2006 | Shiraki et al. ................... 710/51 |

FOREIGN PATENT DOCUMENTS

| JP | 2005-309748 | 11/2005 |
| JP | 2005-322181 | 11/2005 |
| JP | 2007-164572 | 6/2007 |

* cited by examiner

Primary Examiner — David X Yi
(74) Attorney, Agent, or Firm — Foley & Lardner LLP

(57) ABSTRACT

A host server of a storage system transmits path information and a simultaneous command issue number to a storage managing server, while the path information corresponds to such paths that when the host server executes an application program, the host server accesses to a logical volume, the simultaneous command issue number corresponds to a total number of commands issued to the respective paths. A storage monitoring agent server transmits to the storage managing server, an upper limit number of command multiplex numbers. When accepting path information, a simultaneous command issue number, and the command multiplex number upper limit value, the storage managing server proportionally distributes the command multiplex number upper limit value of the port to the respective paths so as to calculate a command multiplex upper limit value, and calculated result.

14 Claims, 23 Drawing Sheets

FIG. 6

402···RESOURCE STATISTICAL INFORMATION TABLE

| # | HOST SERVER | LU | SIMULTANEOUS COMMAND ISSUE NUMBER | COLLECTING TIME INSTANT |
|---|---|---|---|---|
| 1 | A | A | 101 | 2008/2/14 15:00 |
| 2 | A | B | 15 | 2008/2/14 15:00 |
| 3 | A | C | 14 | 2008/2/14 15:00 |
| 4 | B | D | 125 | 2008/2/14 15:00 |
| 5 | C | D | 0 | 2008/2/14 15:00 |
| 6 | D | E | 41 | 2008/2/14 15:00 |

700···HBA-FILE SYSTEM RELATION TABLE

| HOST SERVER | HBA | FILE SYSTEM |
|---|---|---|
| A | A | A |
| A | B | B |
| A | B | C |
| B | C | D |
| C | D | E |
| D | E | F |

800···APPLICATION(AP)PROGRAM-FILE SYSTEM RELATION TABLE

| HOST SERVER | AP | FILE SYSTEM |
|---|---|---|
| A | A | A |
| A | A | B |
| A | B | C |
| B | C | D |
| C | D | E |
| D | E | F |

900⋯FILE SYSTEM-STORAGE APPARATUS RELATION TABLE

| HOST SERVER | FILE SYSTEM | STORAGE APPARATUS | PORT |
|---|---|---|---|
| A | A | A | A |
| A | B | A | B |
| A | C | A | B |
| B | D | A | C |
| C | E | A | D |
| D | F | A | D |

FIG. 10

1000⋯STORAGE APPARATUS-LU RELATION TABLE

| STORAGE APPARATUS | PORT | LU |
|---|---|---|
| A | A | A |
| A | B | B |
| A | B | C |
| A | C | D |
| A | D | D |
| A | D | E |

FIG. 11

1100⋯HOST SERVER-CLUSTER RELATION TABLE

| HOST SERVER | CLUSTER | EXECUTING SYSTEM |
|---|---|---|
| B | A | Yes |
| C | A | No |

FIG. 12

1200⋯COMMAND MULTIPLEX NUMBER UPPER LIMIT VALUE TABLE OF STORAGE APPARATUS-SIDED

| STORAGE APPARATUS | PORT | COMMAND MULTIPLEX NUMBER UPPER LIMIT VALUE |
|---|---|---|
| A | A | 256 |
| A | B | 256 |
| A | C | 256 |
| A | D | 256 |

FIG. 13

1300⋯AP STRUCTURAL INFORMATION TABLE

| HOST SERVER | LU | MAXIMUM LOG-IN USER NUMBER (DEFINED VALUE) | MAXIMUM LOG-IN USER NUMBER (PRESENT VALUE) |
|---|---|---|---|
| A | A | 20,000 | 20,000 |
| A | B | 15,000 | 15,000 |
| B | C | 100,000 | 100,000 |
| C | D | 100,000 | 100,000 |
| D | E | 10,000 | 10,000 |

FIG. 14

419⋯AP SETTING SCHEDULE TABLE

| # | DISTRIBUTION SCHEDULING TIME INSTANT | DISTRIBUTION COMPLETING TIME INSTANT | HOST SERVER | AP | MAXIMUM LOG-IN USER NUMBER (CONTROLLED VALUE) |
|---|---|---|---|---|---|
| 1 | 2008/2/14 15:10 | 2008/2/14 15:11 | A | A | 18,000 |
| 2 | 2008/2/14 15:10 | 2008/2/14 15:11 | A | B | 16,000 |
| 3 | 2008/2/14 15:10 | 2008/2/14 15:11 | B | C | 90,000 |
| 4 | 2008/2/14 15:10 | 2008/2/14 15:11 | C | D | 90,000 |
| 5 | 2008/2/14 15:10 | 2008/2/14 15:12 | D | E | 9,000 |

409 — PATH CORRESPONDENCE TABLE (AFTER ORDERING OPERATION)

| # | HOST SERVER | AP | FILE SYSTEM | HBA | PORT OF STORAGE APPARATUS | LU | BAND GUARANTEE | PRIORITY DEGREE | COLLECTING TIME INSTANT |
|---|---|---|---|---|---|---|---|---|---|
| 1 | A | A | A | A | A | A | NO GUARANTEE | 20% | 2008/2/14 15:00 |
| 2 | A | A | B | B | B | B | NO GUARANTEE | 5% | 2008/2/14 15:00 |
| 3 | A | B | C | B | B | C | NO GUARANTEE | 15% | 2008/2/14 15:00 |
| 4 | B | C | D | C | C | D | GUARANTEE | 40% | 2008/2/14 15:00 |
| 5 | D | E | F | E | D | E | NO GUARANTEE | 20% | 2008/2/14 15:00 |

403···DISTRIBUTION ORDERING CONDITION TABLE

| # | LU | PRIORITY DEGREE | BAND GUARANTEE |
|---|----|----|----|
| 1 | A | 20% | NO GUARANTEE |
| 2 | B | 5% | NO GUARANTEE |
| 3 | C | 15% | NO GUARANTEE |
| 4 | D | 40% | GUARANTEE |
| 5 | E | 20% | NO GUARANTEE |

FIG. 17

406···COMMAND MULTIPLEX NUMBER DISTRIBUTION CONTROL TABLE

| # | HOST SERVER | HBA | LU | COMMAND MULTIPLEX NUMBER DISTRIBUTION AMOUNT |
|---|----|----|----|----|
| 1 | A | A | A | 256 |
| 2 | A | B | B | 133 |
| 3 | A | B | C | 123 |
| 4 | B | C | D | 256 |
| 5 | D | E | E | 256 |

FIG. 18

417···COMMAND MULTIPLEX NUMBER DISTRIBUTION SCHEDULE TABLE

| # | DISTRIBUTION SCHEDULING TIME INSTANT | DISTRIBUTION COMPLETING TIME INSTANT |
|---|----|----|
| 1 | 2008/2/14 15:10 | 2008/2/14 15:11 |
| 2 | 2008/2/14 15:10 | 2008/2/14 15:11 |
| 3 | 2008/2/14 15:10 | 2008/2/14 15:11 |
| 4 | 2008/2/14 15:10 | 2008/2/14 15:11 |
| 5 | 2008/2/14 15:10 | 2008/2/14 15:12 |
| 6 | 2008/2/14 15:10 | 2008/2/14 15:13 |
| 7 | 2008/2/14 15:10 | 2008/2/14 15:11 |

FIG. 19

413···EXTERNAL STORAGE CORRESPONDENCE TABLE

| # | MAPPING DESTINATION STORAGE APPARATUS | LU | MAPPING SOURCE STORAGE APPARATUS | LU |
|---|---|---|---|---|
| 1 | A | H | B | L |
| 2 | A | I | B | M |
| 3 | A | J | C | N |
| 4 | A | K | D | O |

Columns: 1901, 1902, 1903, 1904, 1905

FIG. 20

416···MIRROR VOLUME CORRESPONDENCE TABLE

| # | PRIMARY VOLUME | STORAGE APPARATUS (PRIMARY SITE) | SECONDARY VOLUME | STORAGE APPARATUS (SECONDARY SITE) | COPY SYSTEM |
|---|---|---|---|---|---|
| 1 | P | A | T | B | SYNCHRONOUS |
| 2 | Q | A | U | B | SYNCHRONOUS |
| 3 | R | A | V | B | SYNCHRONOUS |
| 4 | S | A | W | B | ASYNCHRONOUS |

Columns: 2001, 2002, 2003, 2004, 2005, 2006

S404···PRIORITY ORDER SETTING UNIT

S408···PATH CORRESPONDENCE RETRIEVING UNIT

S405···DISTRIBUTED MOVING CANDIDATE SELECTION ORDERING UNIT

FIG. 33

INFLUENCE REPORT SCREEN

INFLUENCE CAUSED BY SWITCHING SYSTEM
HOST   HOST4→HOST5 ～3301
PATH   WWN6→WWN7 ～3302

| # | HOST SERVER | PRIORITY DEGREE | DISTRIBUTION BEFORE SYSTEM SWITCHING | DISTRIBUTION AFTER SYSTEM SWITCHING | INFLUENCE DEGREE |
|---|---|---|---|---|---|
| 1 | HOST6 | 10% | 10 | 5 | -50% |
| 2 | HOST7 | 10% | 10 | 5 | -50% |

“PVOL” and negative logical volume “SVOL”) which are
METHOD FOR MANAGING STORAGE SYSTEM

INCORPORATION BY REFERENCE

The present application claims priority from Japanese application JP2008-146393 filed on Jun. 4, 2008, the content of which is hereby incorporated by reference into this application.

BACKGROUND OF THE INVENTION

1. Field of the Invention

The present invention is related to a storage system capable of improving access performance from a host to storage apparatuses, and also related to a method for managing the storage system.

2. Description of the Related Art

In storage systems, the ranges of which are higher than, or equal to a middle range, ports provided on the side of storage apparatuses, whose port numbers have been limited, are commonly shared by a large number of business hosts. As a result, a function capable of being connected to a plurality of business hosts has been provided to one storage apparatus-sided port. Since a storage apparatus discriminates one business host from other business hosts based upon a WWN (World Wide Name) allocated to an HBA (Host Bus Adapter) of the first-mentioned business host, exclusively-used LUs (Logical Units) can be provided to the respective business hosts by a single port thereof.

There is an upper limit number in command numbers (will be referred to as "command multiplex number" hereinafter) which can be simultaneously executed by a single port provided on the side of a storage apparatus. In order that a total number of commands which are simultaneously issued from respective hosts does not exceed the upper limit number of the storage apparatus-sided port, while the respective hosts have been connected to the above-described single port, HBAs of the respective hosts are required to set upper limit values of command multiplex numbers.

On the other hand, JP-A-2005-322181 discloses such a method for controlling access permissions every path on the side of a storage apparatus. In other words, a storage control apparatus (namely, control apparatus provided on the side of storage apparatus) monitors and controls a total value of command multiplex numbers which are set to respective hosts to be connected in order that this total command multiplex number does not exceed command multiplex processing capability of the storage control apparatus. It should be understood that a path implies an I/O (Input/Output) path which connects a host to a storage apparatus.

SUMMARY OF THE INVENTION

As a problem why the upper limit values of the command multiplex numbers must be set in the HBAs of the respective hosts in order that, as previously described, the total number of simultaneously issued commands does not exceed the upper limit number for the storage apparatus-sided port, the below-mentioned problem (1) is present:

(1) In such a case that since complex setting operation is erroneously carried out, an overflow of command multiple numbers occurs at the port of the storage apparatus, a queue full (namely, command multiplex number overflows) status is returned from the storage apparatus to the host. The HBA which has received this queue full status stops multiplexing of commands. As a result, thereafter, I/O performance is considerably lowered.

In addition to the above-described problem (1), the below-mentioned problems are present:

(2) When a number of commands which are presently simultaneously issued to an LU (Logical Unit) (will be referred to as "simultaneous command issue number") has reached the set upper limit number, so that no more command cannot be multiplexed, such an event occurs in which there is still a spare in command multiplex numbers allocated to other paths. As a consequence, command executing capabilities of the entire ports cannot be sufficiently utilized.

(3) If a main path and a sub-path are provided as a host failure solution, then a useless command multiplex number is fixedly distributed also to the sub-path which is not used under usual condition, so that an efficiency is decreased.

(4) There is no way capable of grasping an adverse influence given to command multiplex numbers of other hosts, which is caused by a system/path switching operation executed when a failure occurs as an opportunity. As a consequence, it is practically difficult to grasp in a quantitative manner a degree of suppression at which a business application program should be suppressed.

(5) If a main path and a sub-path are provided with respect to a pair of logical volumes (namely, positive logical volume "PVOL" and negative logical volume "SVOL") which are formed by a function of a storage apparatus and which bridges the storage apparatus, then such an upper limit value must be set by considering a relation between the main path/sub-path and other paths which commonly ports. However, when the above-described upper limit value is manually set, there are some possibilities that mis-setting operation may be conducted.

(6) In the case where storage apparatuses having different performance are mapped, such a command multiplex number upper limit value must be necessarily distributed by considering a difference contained in the different performance. However, if such a command multiplex number upper limit value is manually set by condering complex mapping situations within the storage apparatus, then there are some possibility that mis-setting operation may be conducted.

(7) In such a case that a load balancer is conducted onto a host so as to multiplex paths, a proper command multiplex number upper limit value must be necessarily distributed in response to an algorithm of the load balancer. However, since such a command multiplex number upper limit value by considering also distributions to other hosts is manually set, there are some possibilities that a mis-setting operation may be conducted. In a general load balance algorithm, it is required that performance of multiplexed paths must become uniform.

The present invention has been made to solve the above-described problems, and therefore, has an object to provide a storage system capable of improving access performance from a host to a storage apparatus, and also to provide a method for managing the above-described storage system.

BRIEF DESCRIPTION OF THE DRAWINGS

FIG. 6 is an explanatory diagram for representing one example about a structure of a resource statistical information table.

FIG. 7 is an explanatory diagram for showing an HBA-file system relation table.

FIG. 8 is an explanatory diagram for indicating an application (AP) program-to-file system relation table.

FIG. 9 is an explanatory diagram for indicating a file system-to-storage apparatus relation table.

FIG. 10 is an explanatory diagram for representing a storage apparatus-to-LU relation table.

FIG. 11 is an explanatory diagram for showing a host server-to-cluster relation table.

FIG. 12 is an explanatory diagram for indicating a command multiplex number upper limit table of a storage apparatus-sided port.

FIG. 13 is an explanatory diagram for indicating an AP structure information table 1300.

FIG. 14 is an explanatory diagram for representing an AP setting schedule table.

FIG. 15 is an explanatory diagram for showing a path correspondence table.

FIG. 16 is an explanatory diagram for indicating a distribution ordering condition table.

FIG. 17 is an explanatory diagram for showing a command multiplex number distribution control table.

FIG. 18 is an explanatory diagram for indicating a command multiplex number distribution schedule table.

FIG. 19 is an explanatory diagram for representing an external storage correspondence table.

FIG. 20 is an explanatory diagram for showing a mirror volume correspondence table.

FIG. 33 illustratively shows a concrete example as to an influence report screen displayed by a distribution influence display unit.

DETAILED DESCRIPTION OF THE INVENTION

Next, a detailed description is made of best modes for carrying out the present invention with reference to drawings.

Figure 1:
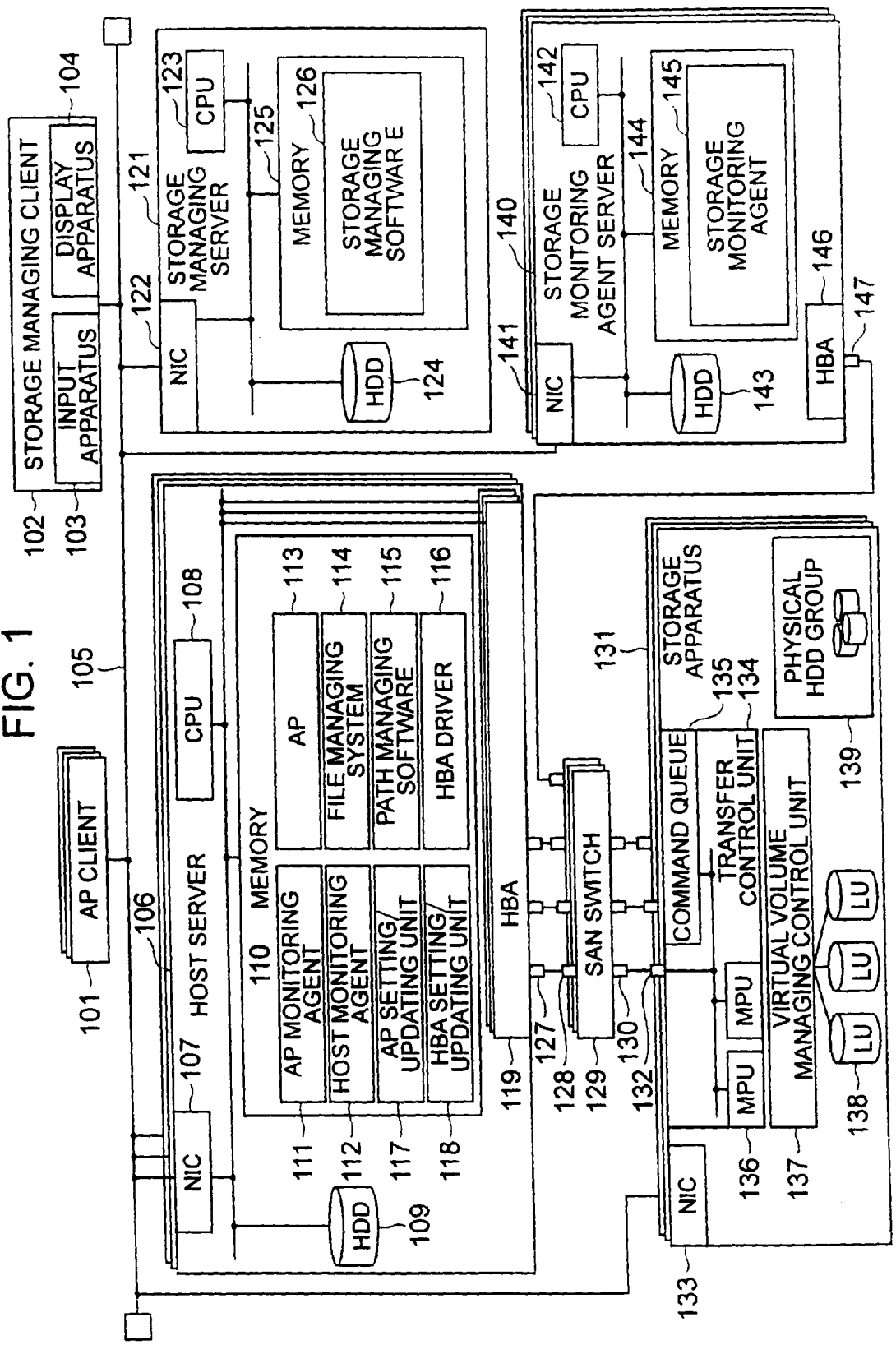
FIG. 1 is a structural diagram for showing a storage system according to an embodiment of the present invention.

FIG. 1 is a structural diagram for showing a storage system according to an embodiment of the present invention. The storage system of the present embodiment contains a business system under storage area network (SAN) environment, and a system for managing storages under the SAN environment.

The hardware which constructs the business system corresponds to an AP client 101, a local area network (LAN) 105, a host server 106, an SAN switch 129, and a storage apparatus 131. The software which constructs the business system corresponds to an application program (AP) 113, a file managing system 114, path managing software 115 for acquiring path information, and an HBA driver 116. It should be understood that if one set, or more sets of the host server 106, the SAN switch 129, the storage apparatus 131, and the AP client 101 are provided, then these devices/apparatuses are preferably utilizable. It should also be noted that symbol "AP" is an abbreviation of an application program.

The hardware which constitutes a system for managing storages under SAN environment corresponds to a storage managing client 102, a storage managing server 121, and a storage monitoring agent server 140. The software which constitutes the system for managing the storages corresponds to storage managing software 126 on the storage managing client 102; a storage monitoring agent 145 on a storage monitoring agent server 140; and also, an AP setting/updating unit 117, an HBA setting/updating unit 118, an AP monitoring agent 111, and a host managing agent 112, which are provided on the host server 106. It should also be understood that if one set, or more sets of the storage monitoring agent server 140 are provided, then these storage monitoring agent servers 140 are preferably utilizable. The respective structural elements will now be described as follows:

(AP Client)

The AP client 101 corresponds to such an apparatus of a personal computer, a workstation, or a thin client terminal, which provides a user interface function of the business system. The AP client 101 is communicated via the LAN 105 with the AP 113 of the host server 106. It should also be understood that the above-described thin client apparatus implies that such a client terminal may be merely provided with a minimum network function used to be connected to a server, and a GUI (Graphic User Interface) through which a user performs input/output operations.

(Host Server)

The host server 106 corresponds to a computer which executes application software in order to provide a service required in business. The host server 106 is equipped with a CPU (Central Processing Unit) 108, a memory 110, a hard disk drive (HDD) 109, a network interface card (NIC) 107, and a host bus adapter (HBA) 119.

The CPU 108 is such a processor which reads various sorts of software programs stored in the HDD 109 into the memory 110, and then, executes the read software programs. In the below-mentioned descriptions, process operations which are executed by software programs read in the memory 110 are actually executed by the CPU 108 which executes these software programs.

The memory 110 corresponds to, for example, such a semiconductor storage apparatus as a RAM (Random Access Memory). Also, as to the HDD 109, for example, such a semiconductor storage apparatus as a flash memory may be alternatively employed, instead of a hard disk apparatus. In the memory 110, a software program which is read out from the HDD 109 and is executed by the CPU 108, and data to which the CPU 108 refers are stored.

Concretely speaking, software programs with respect to at least the AP 113, the AP monitoring agent 111, the host monitoring agent 112, the file managing system 114, the path managing software 115, the HBA driver 116, the AP setting/ updating unit 117, and the HBA setting/updating unit 118 are executed by the CPU 108.

Data inputs/outputs with respect to the storage apparatus 131 by the host server 106 may be executed based upon, for instance, an FC (Fiber Channel) protocol, otherwise may be alternatively executed based upon other protocols. With respect to the communication between the host server 106 and the storage apparatus 131, both the NIC 107 and the LAN 105 may be alternatively used instead of using both the HBA 119 and the SAN switch 129.

The AP 113 corresponds to either software or database (DB) managing software, which provides a business logic function of the business system. In response to a process request issued from the AP client 101, the AP 113 inputs/ outputs data with respect to the storage apparatus 131, if necessary. An access operation from the AP 113 to data stored in the storage apparatus 131 is executed via a port 127 of the HBA 119, a host-sided port 128 of the SAN switch 129, the SAN switch 129, a storage-sided port 130 of the SAN switch 129, and a port 132 of the storage apparatus 131 by utilizing the file managing system 114, the path managing software 115, and the HBA driver 116.

The AP monitoring agent 111 corresponds to such a software used to acquire structural information related to the AP 113. The host monitoring agent 112 corresponds to such a software used to acquire structural information and statistical information, which are related to the file system from the file managing system 114 and the HBA driver 116, and also to acquire a command number issued from an HBA.

The AP setting/updating unit 117 corresponds to such a software which is communicated with the storage managing software 126 on the storage managing server 121 so as to execute a process operation related to setting and updating of the AP 113 in accordance with an instruction thereof. The HBA setting/updating unit 118 corresponds to such a software which is communicated with the storage managing software 126 on the storage managing server 121 so as to execute a process operation related to setting and updating of the HBA 119 in accordance with an instruction thereof.

The NIC 107 is used in order that the host server 106 is communicated with the storage apparatus 131 and the AP client 101 via the LAN 105. The HBA 119 is used in order that the host server 106 is communicated with the storage apparatus 131 via the SAN switch 129. The HBA 119 is equipped with a port 127 functioning as a connection terminal of a communication cable.

The file managing system 114 corresponds to a portion of basic software (OS: Operating System) of the host server 106, and provides a storage area in the unit of a file, while the storage area constitutes a data input/output destination with respect to the AP 113. Files which are managed by the file managing system 114 are defined in correspondence with logic devices (by operating mount) which are managed by the OS in the unit of a certain one group (will be referred to as "file system" hereinafter). In most of cases, the files contained in the file system are managed in a tree structure.

(SAN Switch)

The SAN switch 129 sets a data access path between the host server 106 and the storage apparatus 131 by switching connections between host-sided ports 128 and storage-sided ports 130, which are provided in the SAN switch 129.

(Storage Apparatus)

The storage apparatus 131 is provided with a port 132 employed in order to be communicated via the SAN switch 129 with either the host server 106 or the storage monitoring agent server 140; an NIC 133 employed in order to be communicated with the storage management server 121 via the LAN 105; a transfer control unit 134; a virtual volume managing control unit 137; and a physical HDD group 139. The transfer control unit 134 is equipped with a command queue 135 and a microprocessor (MPU: Micro Processing Unit) 136.

The MPU 136 stores either a read command or a write command issued from the host server 106 via the port 132 into the command queue 135, and transfers commands to lower-grade layers in an arrival order of these commands.

The transfer control unit 134 provides such a function capable of multiplexing commands by transferring a next command without awaiting a completion of a command which has been transferred to the lower grade layer. The command queue 135 corresponds to such a semiconductor storage apparatus as a dynamic RAM.

The virtual volume managing control unit 137 has a function for causing a storage area of the physical HDD group 139 to be represented as a virtual logical volume (LU) 138 with respect to the host server 106, and another function for providing the LU 138 from one storage-sided port 132 to a plurality of host servers 106. Although FIG. 1 has indicated such an arrangement that the virtual volume managing control unit 137 has been built in the storage apparatus 131, the virtual volume managing control unit 137 may be alternatively arranged in such a manner that this virtual volume managing control unit 137 is operated in a server independently operable with respect to the storage apparatus 131.

The storage apparatus 131 may be alternatively arranged as follows: That is, the storage apparatus 131 may alternatively provide the LU 138 exclusively to each of the host servers 106 by such a manner that one port 132 of the storage apparatus 131 is commonly used by the plural host servers 106 via the SAN switch 129, and the transfer control unit 134 discriminates the HBA 119 based upon the WWN.

(Storage Managing Client)

The storage managing client 102 corresponds to an apparatus which provides the use interface function of the storage managing software 126. The storage managing client 102 is equipped with at least an input apparatus 103 which accepts an input operation from a user, and a display apparatus 104 which displays thereon information with respect to the user. The display apparatus 104 is such an image display apparatus as a CRT (Cathode-Ray Tube), or a liquid crystal display device. An example as to images to be displayed on the display apparatus 104 will be described later. The storage managing client 102 is communicated with the storage managing software 126 of the storage managing server 121 via the LAN 105.

(Storage Managing Server)

The storage managing server 121 corresponds to such a computer which stores thereinto a summary (will be discussed later) as to structural information and performance statistical information of the storage apparatus 131, which have been collected by the storage monitoring agent 145, and another summary (will be also discussed later) as to structural information and performance statistical information of the host server 106, which have been collected by the host monitoring agent 112. In addition, the computer executes software having functions which are provided to the storage managing client 102. Alternatively, the storage managing server 121 may be such a computer which executes software capable of providing an interface to the storage managing client 102, while the above-described interface manages setting information about the storage monitoring agent 145 and the host monitoring agent 112.

The storage managing server 121 is equipped with a CPU 123, a memory 125, an HDD 124, and an NIC 122. The CPU 123 corresponds to a processor which reads out a software program stored in the HDD 124 so as to read the software program in the memory 125, and executes the read software program. In the below-mentioned description, a process operation which is executed by a software program read in the memory 125 is actually executed by the CPU 123 which executes this read software program. The memory 125 is a semiconductor storage device, for example, a dynamic RAM. Both a software program which is read out from the HDD 124 and is executed by the CPU 123, and data to which the CPU 123 refers are stored in the memory 125. Concretely speaking, at least the storage managing software 126 is executed by the CPU 123.

The storage managing software 126 corresponds to such a software which provides the following functions: a function for collecting and monitoring structural information, statistical information, and AP execution managing information of the SAN; and a function for automatically controlling an upper limit value of a command multiplex number of the HBA 119. In order to acquire structural information and statistical information from hardware and software which constitute the SAN, the storage managing software 126 utilizes agent software exclusively used in the hardware and the software, respectively.

Also, in order to automatically control the upper limit value of the command multiplex number of the HBA 119, the storage managing software 126 utilizes the HBA setting/updating unit 118. Also, in order to automatically control setting of the AP 113, the storage managing software 126 utilizes the AP setting/updating unit 117.

The NIC 122 is used in order that the storage managing server 121 is communicated via the LAN 105 with the storage managing client 102, the storage managing agent server 140, the host server 106, and the storage apparatus 131. Alternatively, the communication between the storage managing server 121 and the storage apparatus 131 may be established via the SAN switch 129 by employing an HBA (not shown).
(Storage Monitoring Agent Server)

The storage monitoring agent server 140 is such a computer that executes software capable of collecting and storing both the structural information and the performance statistical information of the storage apparatus 131. The storage monitoring agent server 140 is equipped with a CPU 142, a memory 144, an HDD 143, an NIC 141, and an HBA 146. In such a case that a storage capacity of the storage apparatus 131 is very large, or plural sets of the above-described storage apparatuses 131 are provided in a business system, the below-mentioned arrangement may be alternatively employed: That is, plural sets of the storage monitoring agent servers 140 may be installed in order to subdivide the monitoring range.

The CPU 142 corresponds to a processor which reads out a software program stored in the HDD 143 and reads the read software program in the memory 144 so as to execute the read software program. In the below-mentioned description, a process operation which is executed by a software program read in the memory 144 is executed by the CPU 142. The memory 144 is a semiconductor storage device, for example, a dynamic RAM. As to the HDD 143, instead of a hard disk drive, for instance, a semiconductor storage device such as a flash memory, or an optical disk apparatus may be alternatively utilized.

Both the software which is read out from the HDD 143 and is executed by the CPU 142, and data to which the CPU 142 refers are stored in the memory 144. Concretely speaking, at least the storage monitoring agent 145 is executed by the CPU 142. The NIC 141 is utilized in order that the storage monitoring agent server 140 is communicated with the storage managing server 121 via the LAN 105.

The storage monitoring agent 145 corresponds to such a software which acquires the structural information and the statistical information related to the storage apparatus 131 via the port 147 of the HBA 146 and the SAN switch 129.

The HBA 146 is used in order that the storage managing agent server 140 is communicated via the SAN switch 129 with the storage apparatus 131. The HBA 146 is equipped with a port 147 functioning as a connection terminal of a communication cable. In order to establish the communication between the storage monitoring agent server 140 and the storage apparatus 131, both the NIC 141 and the LAN 105 may be alternatively used instead of using of both the HBT 146 and the SAN switch 129.

It should also be noted that various sorts of methods may be employed with respect to structures and arrangements of the agent software. Although FIG. 1 has disclosed such a structure that the storage monitoring agent 145 is executed by the exclusively-used storage monitoring agent server 140, it is also possible to employ another structure that the storage monitoring agent 145 may be alternatively executed by the storage managing server 121. Moreover, as the communication path with respect to the storage apparatus 131, instead of the communication path established via the HBA 146, the SAN switch 129, and the port 132, another communication path established via the NIC 141, the LAN 105, and the NIC 133 may be alternatively employed.

Figure 2:
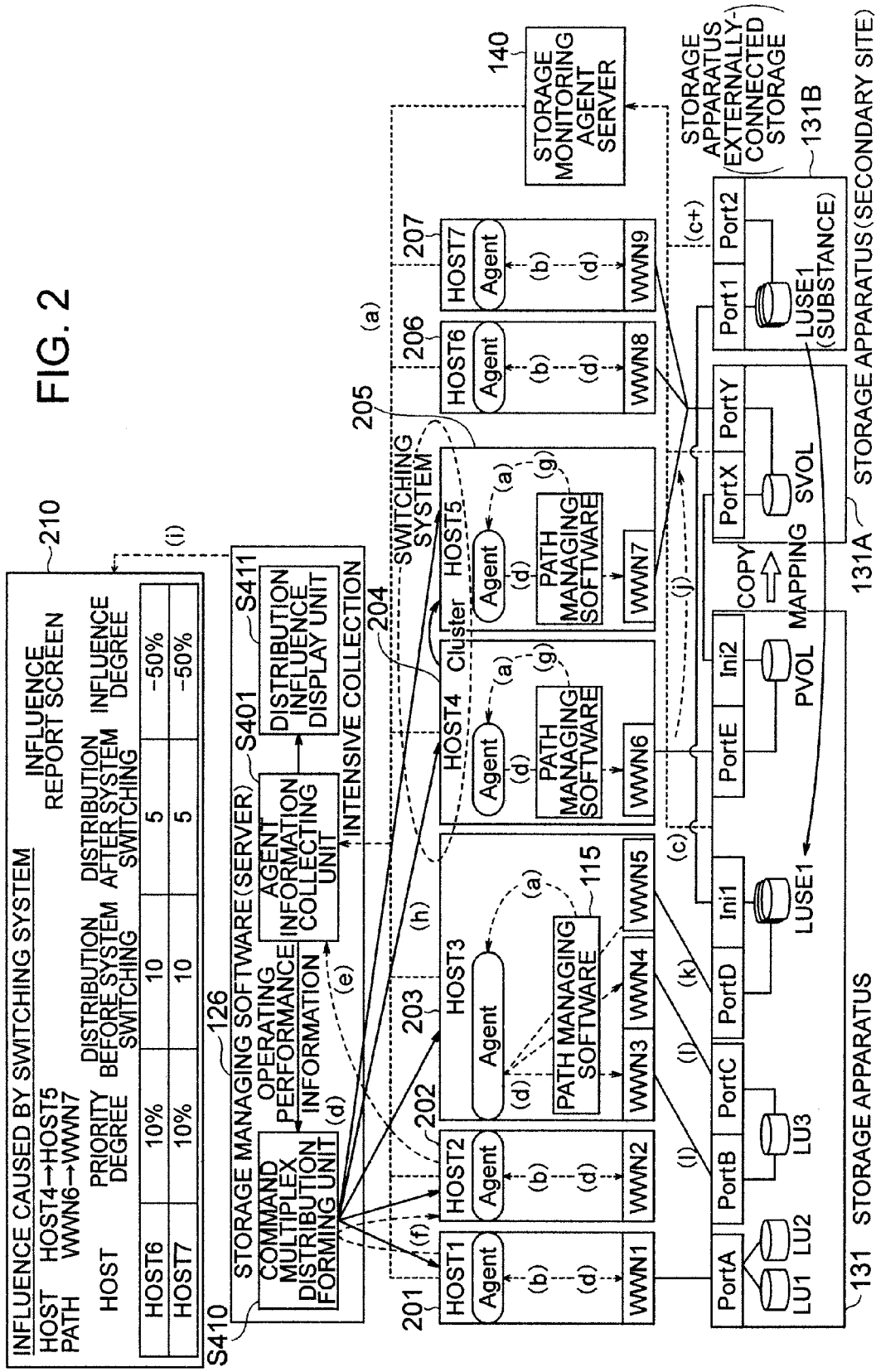
FIG. 2 is a conceptional diagram for indicating a basic idea of the present embodiment.

FIG. 2 is a conceptional diagram for representing a basic idea of the present embodiment.

A processing sequence for the method of managing the storage system will now be described as to items (a) to (l) with reference to FIG. 1 in a proper manner. It should be understood that the items (a) to (l) correspond to items (a) to (l) shown in FIG. 2, and have been described in major portions. Also, as the solving means described in the above-described problem items (1) to (7), the below-mentioned items (1) to (7) may correspond thereto.

Figure 21:
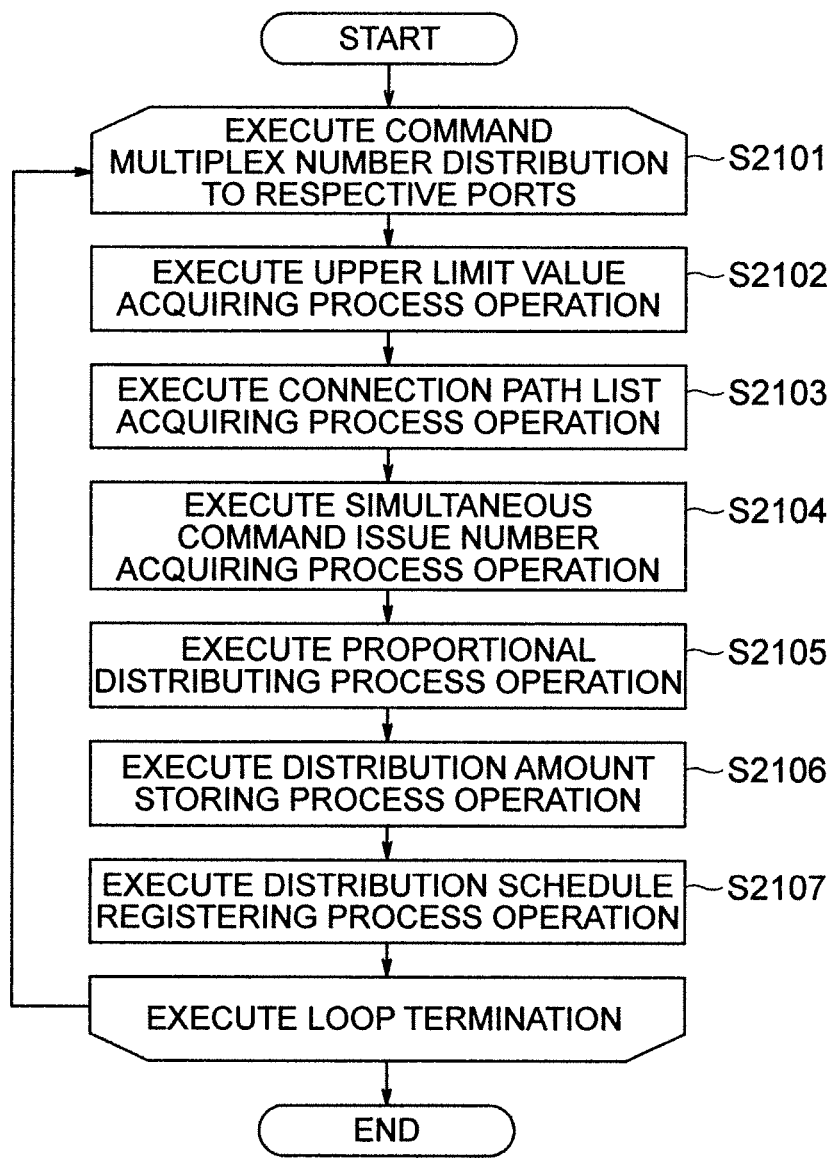
FIG. 21 is a flow chart for describing a process operation of a command multiplex number distribution forming unit.

(1) Basic Sequence (refer to FIG. 21).

The basic sequence is arranged by the below-mentioned items (a) to (d).

(a) The storage managing server 121 (which has been described as storage managing software 126 in FIG. 2) acquires path information from the host server 106 via the path managing software 115.

(b) The host server 106 monitors a total number of commands issued at the same time every path, and calculates an averaged value thereof every path, and the storage managing server 121 collects the calculated average values. It should also be noted that a variation in the numbers of the commands issued at the same time is being monitored on the host server 106. Concretely speaking, the driver (software) of the HBA 119 is managing a total number of commands issued from the host server 106. An upper limit value of the command multiplex number every path (every logical unit) is settable.

(c) The storage monitoring agent server 140 acquires an upper limit value of the command multiplex numbers as to ports of the storage apparatus 131, and then, the storage managing server 121 collects the acquired upper limit values.

(d) The storage managing server 121 proportionally distributes the upper limit value of the command multiplex number as to the ports of the storage apparatus 131 obtained in the item (c) based upon the acquired value which has been acquired for each of the paths, transmits the distributed result to the host server 106, and then, the host server 106 reflects this distributed result.

Concretely speaking, in a host 201 (HOST 1), a host 202 (HOST 2), a host 203 (HOST 3), a host 204 (HOST 4), and a host 205 (HOST 5) shown in FIG. 2, an agent information collecting unit S401 of the storage managing software 126 acquires the path information from the respective hosts 201 to 205. Also, the agent information collecting unit S401 has collected information about a simultaneous command issuing number. Furthermore, the agent information collecting unit S401 has acquired the upper limit value of the command multiplex numbers as to the ports of the storage apparatus 131. The agent information collecting unit S401 passes operation performance information to a command multiplex number distribution forming unit S410, and the command multiplex number distribution forming unit S410 notifies a distribution result to the hosts 201, 202, 203, 204, and 205. Each of the hosts 201, 202, 203, 204, and 205 can set a command multiplex number with respect to each of the paths for each of the HBAs (namely, WWN 1 to WWN 7 in FIG. 2). As a result, the upper limit value of the command multiplex number every path can be automatically set, so that it is possible to avoid a deterioration in I/O performance from a host to the storage apparatus 131. It should also be understood that the above-described operation performance information contains information related to a resource statistical information table 402 and a resource structural information table 407 (will be discussed later).

(2) The below-mentioned sequences are added to the above-described basic sequence (1) (refer to FIG. 26).

(e) The host server 106 senses that the simultaneous command issue number every path reaches the upper limit value of the command multiplex number every path, and then, notifies the sense result to the storage managing server 121.

(f) The storage managing server 121 notifies an instruction to the host server 106, while this instruction instructs that such a command multiplex number which has not yet reached the upper limit, or has been allocated to a path having a low business priority is temporarily moved to this path.

Concretely speaking, in FIG. 2, in such a case that the host server 106 has sensed that the simultaneous command issue number every path has reached the upper limit value of the command multiplex numbers on the host 202, the host server 106 notifies this sense result to the storage managing server 121. While the storage managing server 121 monitors statuses of other hosts, the storage managing server 121 can instruct the host 202 that such a command multiplex number which has not yet reached the upper limit value thereof, or a command multiplex number which has been allocated to a path having a low business priority is temporarily moved to another path whose command multiplex number has reached the upper limit value. As a result, when a simultaneous command issue number which is being presently issued at the same time to the LUs has reached the set upper limit value and thus no more command can be multiplexed, and when a command multiplex number allocated to another path has some room, command executable performance of ports can be sufficiently utilized as an entire system.

(3) The below-mentioned sequences are added to the above-described basic sequence (1) (refer to FIG. 23).

(g) A system/path switching occurrence situation is acquired from the path managing software 115 of the host server 106, and then, the acquired system/path switching occurrence situation is notified to the storage managing server 121.

(h) The storage managing server 121 instantaneously executes the sequences (a) to (d) when the system/path switching operation occurs.

Concretely speaking, as being surrounded by an ellipse of a broken line in FIG. 2, when a system switching operation from the host 204 to the host 205 occurs, the host 204 notifies the occurrence of this system switching operation to the storage managing server 121, and performs a path switching operation in connection with the system switching operation to the host 205. As a result, the upper limit value of the command multiplex number every path can be automatically and instantaneously controlled in correspondence with the occurrence of the failure.

(4) The below-mentioned sequence is added to the above-described sequence (3).

(i) The storage managing server 121 displays such a screen image on a switching destination port as an influence degree to performance caused by switching a path with respect to the previously connected host, while this screen image indicates (lowered distribution amount)/(distribution amount obtained immediately before path is switched). Otherwise, the storage managing server 121 automatically controls an upper limit number of application software user numbers in directly proportional to the influence degree.

Concretely speaking, in FIG. 2, a distribution influence display unit S411 displays an influence report screen 210. In a cluster constructed of the host 204 and the host 205, FIG. 2 represents an example of such an influence report screen when an execution-system host has been switched from the host 204 to the host 205. An influence degree of the host 206 (HOST 6) and the host 207 (HOST 7) which are utilizing the port Y (Port Y) of the storage apparatus 131A has been indicated on the influence report screen 210, since the system has been switched. A detailed content thereof will be explained later with reference to FIG. 33. It should also be noted that the automatic control for controlling the upper limit number of the application software user numbers is carried out by the AP setting/forming unit S420 (refer to FIG. 4). As a result, the application software control can be automatically carried out based upon the failure influence degree.

(5) The below-mentioned sequence is added to the above-explained sequence (3).

(j) While an occurrence of system switching operation is employed as an opportunity, the storage managing server 121 calculates a command multiplex number upper limit number of a path to a virtual volume "SVOL" by the system of the sequence (d) based upon a monitored value of a simultaneous command issue number with respect to the path for the virtual volume "PVOL."

Concretely speaking, in FIG. 2, the storage managing server 121 calculates the upper limit value of the command multiplex numbers of the path for the virtual volume SVOL of the storage apparatus 131A corresponding to a secondary site by utilizing the monitored value of the virtual volume PVOL of the storage apparatus 131, and then, utilizes the calculated upper limit value. As a consequence, since an I/O history with respect to the SVOL is not present before the system is switched, the monitored value of the PVOL can be utilized.

(6) The below-mentioned sequences are added to either the above-described sequence (1) or the above-explained sequence (3) (refer to FIG. 22).

(c+) The storage monitoring agent server 140 acquires a command multiplex number upper limit value for a port of an externally-connected storage apparatus, and the storage managing server 121 collects the acquired command multiplex number upper limit values.

(k) The storage managing server 121 distributes a command multiplex number, while the command multiple number upper limit value for the port of the external storage apparatus is employed as a command multiplex number upper limit of a path for the mapped LUSE 1.

Concretely speaking, in FIG. 2, while the command multiple number upper limit value for the ports of the external storage apparatus 131B is employed as the command multiplex number upper limit value for the path to the mapped LUSE 1 of the storage apparatus 131, this sequence (k) implies that the command multiple number is distributed.

(7) The below-mentioned sequence is added to the above-described sequence (1) (refer to FIG. 25).

(l) Generally speaking, since a multiplexed path requires a high priority and maximum performance, a maximum value is employed from the simultaneous command issue numbers distributed to the respective load-balanced paths based upon the primary calculation. With respect to the load-balanced paths, the maximum value among the simultaneous command issue numbers calculated in the sequence (b) is uniformly distributed, and the maximum value is again proportionally distributed to other paths based upon the system of the sequence (d).

Concretely speaking, in FIG. 2, the maximum value is uniformly distributed to the paths to both Port B and Port C with respect to the LU 3 of the logical volume. As a result, the port performance of the load-balanced path structure can be automatically tuned.

Figure 3:
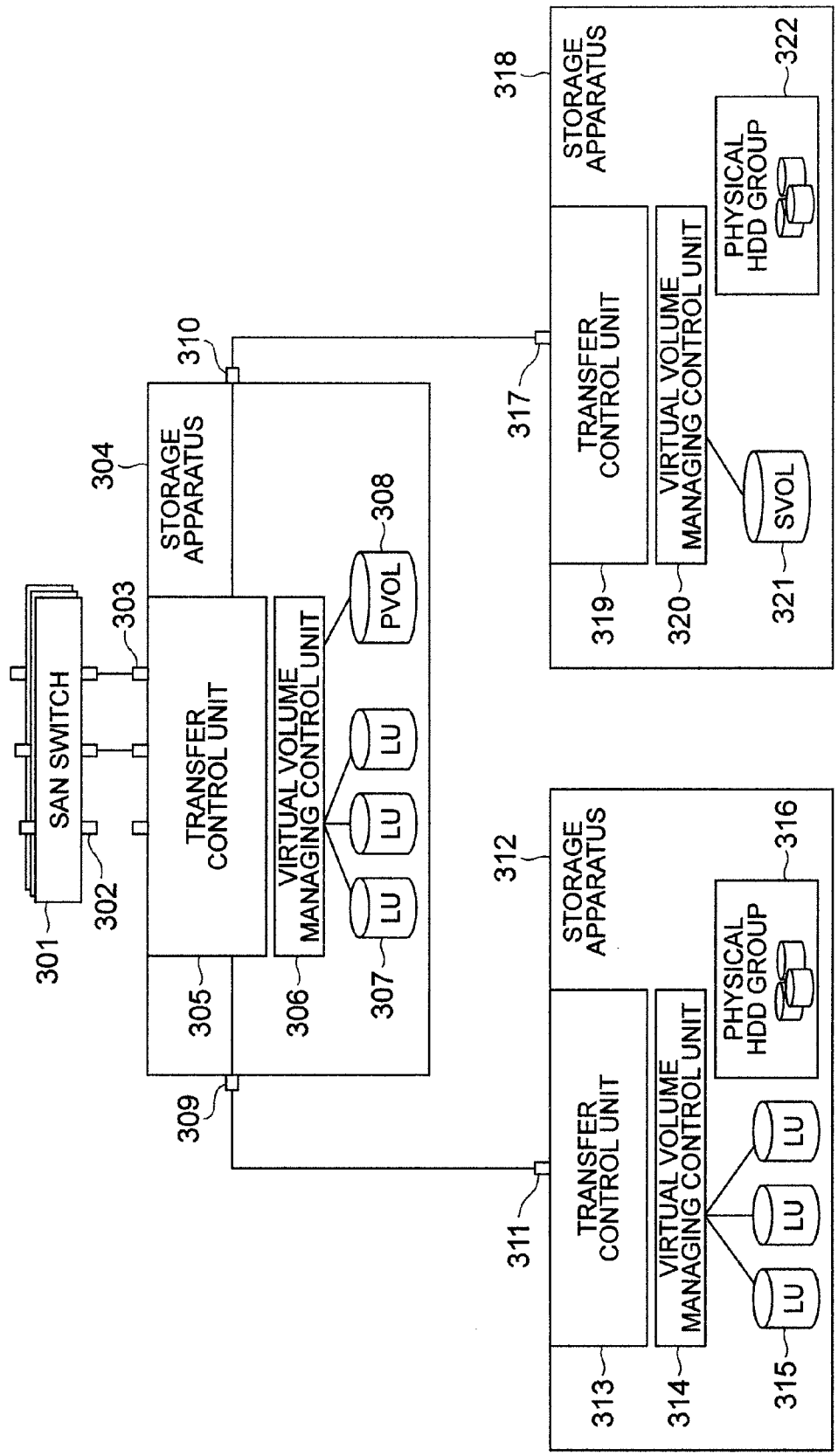
FIG. 3 is a system structural diagram for representing a modification of storage apparatuses employed in the storage system shown in FIG. 1.

FIG. 3 is a system structural diagram for indicating a modification of a storage apparatus. In the system structural diagram shown in FIG. 3, a storage apparatus 312 has been externally connected to a storage apparatus 304, as compared with that of FIG. 1. Otherwise, a storage apparatus 318 is connected as a sub-site with respect to the storage apparatus 304 corresponding to a major site.

The storage apparatus 304 contains a transfer control unit 305, a virtual volume managing control unit 306, an LU 307, and a virtual volume PVOL 308. The storage apparatus 312 contains a transfer control unit 313, a virtual volume managing control unit 314, an LU 315, and a physical HDD group 316. Similarly, the storage apparatus 318 contains a transfer control unit 319, a virtual volume managing control unit 320, a virtual volume SVOL 321, and a physical HDD group 322.

The storage apparatus 304 maps virtual volumes of the LU 315 as the LU 307, which have been formed on the physical HDD group 316 of the externally-connected storage apparatus 312; an I/O which has been issued via the port 303 to the LU 307 is transferred via the port 309 and the port 311 to the LU 315; and then, is processed as an I/O to the physical HDD group 316.

While the storage apparatus 304 and the storage 318 have a main/sub-storage apparatus relation, the virtual volume PVOL 308 established on the storage apparatus 304 is synchronously copied to the virtual volume SVOL 321 via the port 310 and the port 317, so that it is possible to guarantee that the content of the virtual volume PVOL 308 is continuously identical to the content of the virtual volume SVOL 321.

Figure 4:
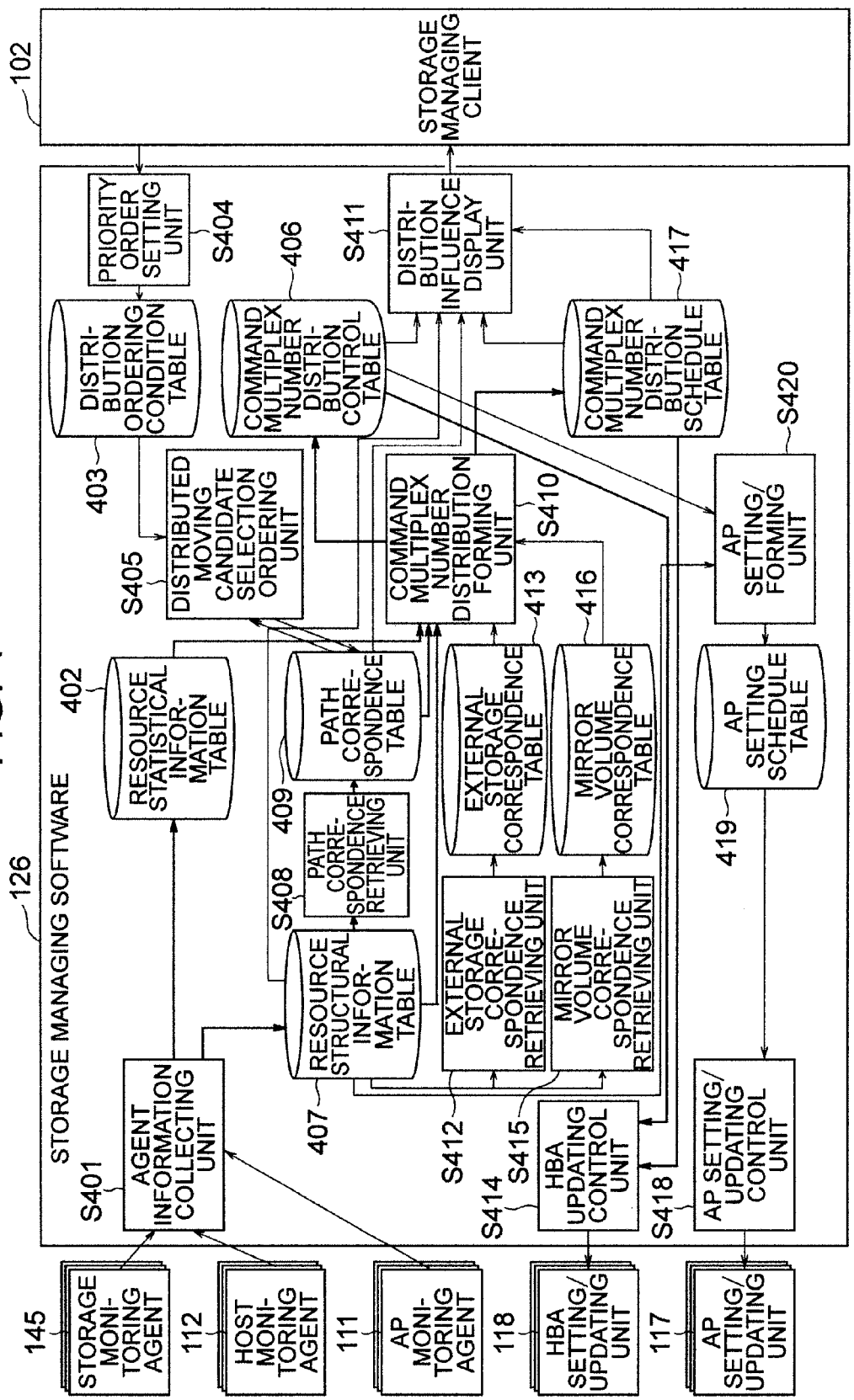
FIG. 4 is a functional block diagram for indicating a managing method of the storage system according to an embodiment of the present invention.

FIG. 4 is a functional block diagram for representing a method of managing the storage system. Referring properly to FIG. 1, a description is made of this managing method for the storage system. The storage managing software 126 contains, as program modules, an agent information collecting unit S401 (refer to FIG. 27); a priority order setting unit S404 (refer to FIG. 28); a distributed moving candidate selection ordering unit S405 (refer to FIG. 30); a path correspondence retrieving unit S408 (refer to FIG. 29); a command multiplex number distribution forming unit S410 (refer to FIG. 21 through FIG. 23, FIG. 25, and FIG. 26); a distribution influence display unit S411; an external storage correspondence retrieving unit S412 (refer to FIG. 31); an HBA setting/updating control unit S414; a mirror volume correspondence retrieving unit S415 (refer to FIG. 32); an AP setting/updating control unit S418; and also, an AP setting/forming unit S420 (refer to FIG. 24).

Also, a resource statistical information table 402 (refer to FIG. 6), a distribution ordering condition table 403 (refer to FIG. 16), a resource structural information table 407 (refer to FIG. 34), a path correspondence table 409 (refer to FIG. 15), a command multiplex number distribution control table 406 (refer to FIG. 17), an external storage correspondence table 413 (refer to FIG. 19), a mirror volume correspondence table 416 (refer to FIG. 20), a command multiplex number distribution schedule table 417 (refer to FIG. 18), and an AP setting schedule table 419 (refer to FIG. 14) are stored in either the memory 125 or the HDD 124.

Both structural information and statistical information related to the SAN environment are collected and also monitored in the above-described manner. The AP monitoring agent 111, the host monitoring agent 112, and the storage monitoring agent 145 are initiated at predetermined timing (for example, is initiated by timer in periodic manner in accordance with scheduling setting operation), or are initiated in response to a request issued from the storage managing software 126, so that the own agent acquires either structural information or statistical information from a monitoring subject apparatus, or software, which are handled by the own agent. Similarly, the agent information collecting unit S401 of the storage managing software 126 is initiated at predetermined timing (for example, is initiated in periodic manner in accordance with scheduling setting operation), and collects either structural information or statistical information from the AP monitoring agent 111, the host monitoring agent 112, and the storage monitoring agent 145.

Then, the agent information collecting unit S401 stores the collected information as any one of the resource structural information table 407 and the resource statistical information table 402. In the resource statistic information table 402, a simultaneous issue number of commands which are issued from the host server 106 via the HBA 119 to the storage apparatus 131 is contained as such an information which is monitored by that the host monitoring agent 112 makes an interrogation to the HBA driver 116.

It should also be understood that a resource implies such a generic name originated from hardware (namely, storage apparatus and host server) which constitutes an SAN, and from physical, or logical structural elements thereof (namely, array group and logical volume); and programs (namely, business software, database managing system, file managing system, and volume managing software) executed on the above-described hardware, and logical structural elements thereof (namely, file system and logic device).

The resource structural information table 407 may be mainly subdivided into both relative information among resources, and attribute information about individual resources. The former-mentioned relative information indicates a depending relation of I/O located among the resources. For instance, in such a case that an I/O command for a resource "A" is converted into an I/O command for a resource "B" and the converted I/O command is processed, or in the case where process performance of the resource "B" is used when the I/O command for the resource "A" is processed, there is such an I/O depending relationship between the resource "A" and the resource "B."

Figure 34:
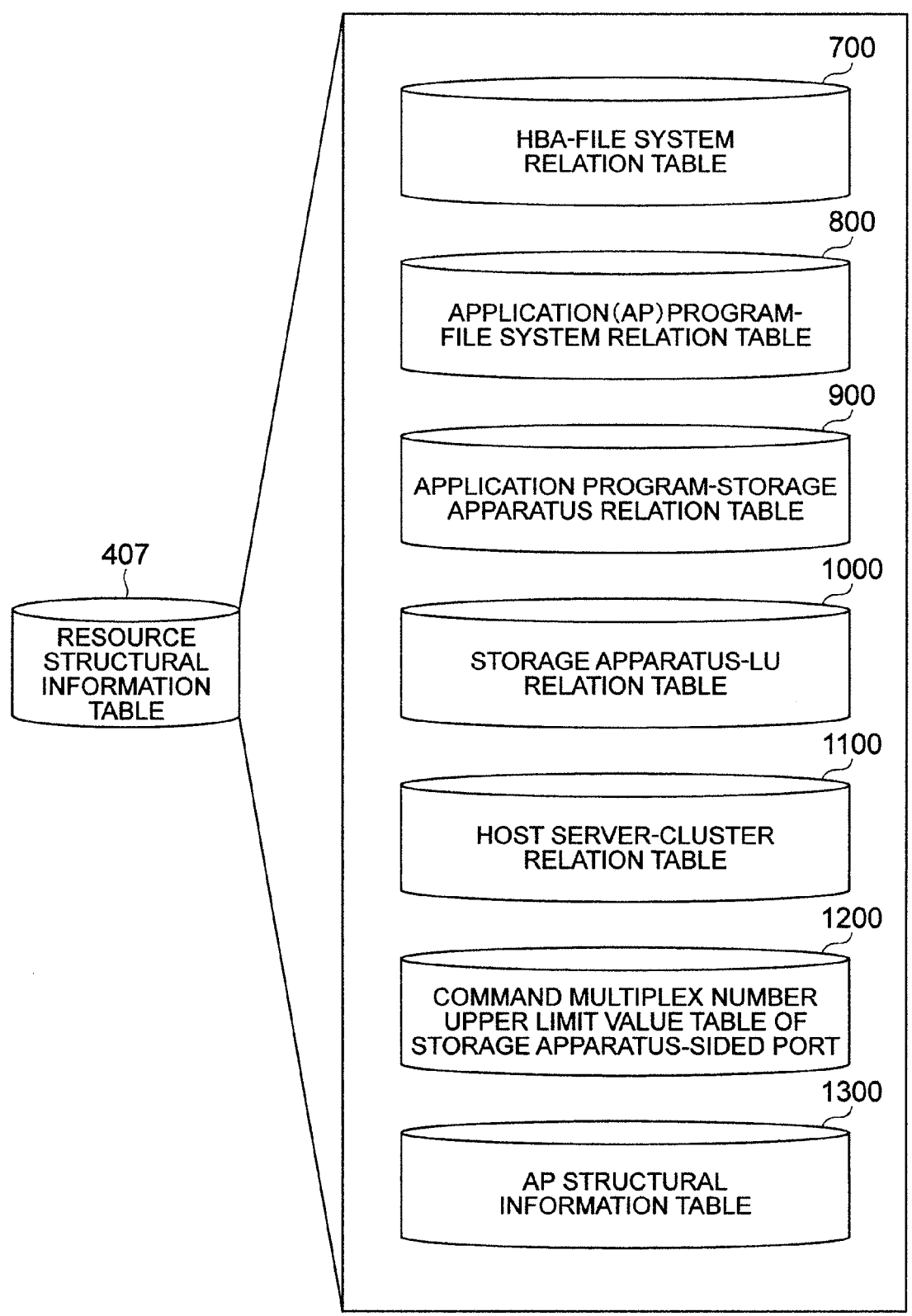
FIG. 34 is an explanatory diagram for indicating various sorts of tables which are contained in a resource structural information table.

FIG. 34 is an explanatory diagram for indicating various sorts which are contained in the resource structural information table 407. The resource structural information table 407 contains an HBA-file system relation table 700 (refer to FIG. 7); an application software (AP)-file system relation table 800 (refer to FIG. 8); a file system-storage apparatus relation table 900 (refer to FIG. 9); a storage apparatus-LU relation table 1000 (refer to FIG. 10); a host server cluster relation table 1100 (refer to FIG. 11); a command multiplex number upper limit value table 1200 (refer to FIG. 12) of a storage apparatus-sided port; and an AP structural information table 1300 (refer to FIG. 13). A detailed description about the various sorts of these tables will be made later.

The storage managing client 102 displays a path list (not shown in the drawing) on the screen, which has been acquired from either the resource structural information table 407 or the path correspondence table 409, and the storage managing client 102 causes the user to enter priority orders of the respective paths, or a condition for determining the priority orders, and then, transmits the set information to the priority order setting unit S404. The priority order setting unit S404 stores either the entered priority order or the entered condition for determining priority order into the distribution ordering condition table 403.

The distributed moving candidate selection ordering unit S405 is initiated at such a timing when the path correspondence table 409 is updated (namely, at timing when path switching operation occurs, while system switching operation in host server 106 is defined as opportunity), or is initiated by receiving a request issued from the storage managing software 126, and then, the distributed moving candidate selection ordering unit S405 adds, or updates the priority order information with respect to the path information stored in the path correspondence table 409 based upon the information stored in the distribution ordering condition table 403.

The command multiplex number upper limit value to be given to the HBA 119 of the host server 106 is automatically controlled in accordance with the below-mentioned manner: That is, the command multiplex number distribution forming unit S410 is initiated at such a timing when either the resource statistical information table 402 or the resource structural information table 407 has been updated by the agent information collecting unit S401, or is initiated by receiving a request from the storage managing software 126. The command multiplex number distribution forming unit S410 groups paths connected to the same port 132 based upon the path correspondence information stored in the path correspondence table 409, and then, extracts command multiplex number statistical information related to the HBA 119 of the host server 106 present on such paths located within the same group from the resource statistical information table 402.

Moreover, the command multiplex number distribution forming unit S410 extracts a command multiplex number upper limit value of the port 132 of the storage apparatus 131 from the resource structural information table 407, and calculates such a value that the extracted command multiplex number upper limit value is proportionally distributed to the respective HBAs within the group in response to the value as to the command multiplex number statistical information related to the HAB 119. The command multiplex number distribution forming unit S410 stores the command multiplex number distributed amount every HBA into the command multiplex number distribution control table 406 in the unit of a group. In addition, the command multiplex number distribution forming unit S410 stores a distribution executing time instant (for example, if distribution is instantly executed, then present time instant is employed), and a link (for instance, index and ID number) to the distribution amount data of the command multiplex number distribution control table 406 into the command multiplex number distribution schedule table 417 every group.

For instance, a calculation formula about the proportional distribution is given by the below-mentioned formula (A1):

In FIG. 2, assuming now that a distribution amount of a command multiplex number with respect to such an I/O path from the host 201 (HOST 1) to the LU 1 is equal to "f1", $$f1 = F \times m1/(m1+m2+m3+m4+---)  \quad (A1)$$

Note:

Symbol "F" indicates a command multiplex number upper limit value of a port "A" (Port A) of a storage apparatus;

Symbols m1, m2, m3, m4, - - - represent simultaneous command issue numbers (average number per unit time) for the respective LUs connected to the port "A."

It should also be noted that the values of m1, m2, m3, m4, - - - are monitored by a host monitoring agent via an HBA driver. The proportional distribution is carried out every LU.

In such a case that as a result for calculating the command multiplex number distribution amount (namely, primary distribution) by the command multiplex number distribution forming unit S410, an unbalance distribution is performed with respect to such a path that a path multiplexing operation is carried out by a load balancer, the command multiplex number distribution forming unit S410 makes a correction in accordance with the below-mentioned sequences:

[Sequence 1]

A check is made of a maximum distribution amount among the distribution amounts which have been allocated to the respective paths load-balanced by the primary distribution.

[Sequence 2]

The maximum distribution amount calculated in the sequence 1 is uniformly allocated to the respective load-balanced paths.

[Sequence 3]

The distribution amount allocated in the above-described sequence 2 is subtracted from the command multiplex number upper limit value as to the port 132 of the storage apparatus 131, and then, the remaining command multiplex number distribution amount is again proportionally distributed to paths other than the paths which have been connected to the port 132 and have been load-balanced.

The HBA setting/updating control unit S414 is initiated at such a timing when the command multiplex number distribution schedule table 417, or in response to a request issued from the storage managing software 126; the HBA setting/updating control unit S414 extracts the latest distribution schedule stored in the command multiplex number distribution schedule table 417, and also, extracts distribution amount information from the command multiplex number distribution control table 406, while a link (for example, index and ID number) stored in the distribution schedule is employed as a key; and then, the HBA setting/updating control unit S141 issues an update command based upon a designated distribution amount at a designated time instant with respect to the HBA setting/updating unit 118 of the host server 106.

In such a case that the host monitoring agent 112 detects that a number of commands simultaneously issued from the host server 106 has reached the command multiplex number upper limit value distributed to the HBA 119, the command multiplex number distribution forming unit S410 is initiated by the storage managing software 126, a partial number of the command multiplex numbers which have been allocated to other paths, the present command multiplex number has not reached the upper limit number is distributed and moved to the HBA 119 whose command multiplex number has reached to the upper limit value. A distribution moving source is distributed and moved from an HBA having a lower priority order to an HBA having a higher priority order based upon the ordering information stored in the path correspondence table 409 by the distributed moving candidate ordering unit S405.

The external storage correspondence retrieving unit S412 is initiated at such a timing when the resource structural information table 407 is updated, or is initiated by receiving a request issued from the storage managing software 126, and then, stores correspondence relative information into the external storage correspondence table 413. The correspondence relative information is defined between the virtual volume LU 307 mapped on the storage apparatus 304 and the externally-connected storage apparatus 312. A detailed process content will be explained in FIG. 22, in which the command multiplex number distribution forming unit S410 calculates a command multiplex number distribution amount by employing the correspondence relative information stored in the external storage correspondence table 413.

The mirror volume correspondence retrieving unit S415 is initiated at such a timing when the resource structural information table 407 is updated, or is initiated by receiving a request issued from the storage managing software 126, and then, stores synchronous copy correspondence relative information into the mirror volume correspondence table 416. The synchronous copy correspondence relative information is defined between the virtual volume PVOL 308 (refer to FIG. 3) equivalent to a primary volume formed on the storage apparatus 304, and the virtual volume SVOL 321 (refer to FIG. 3) equivalent to a secondary volume formed on the externally-connected storage apparatus 318. A detailed process content will be explained in FIG. 23, in which the command multiplex number distribution forming unit S410 calculates a command multiplex number distribution amount by employing the synchronous copy correspondence relative information stored in the mirror volume correspondence table 416.

The distribution influence display unit S411 is initiated at such a timing when the path correspondence table 409 is updated (namely, timing when path switching operation occurs, while system switching operation in host server 106 is defined as opportunity), or is initiated by receiving a request issued from the storage managing software 126; and also, the distribution influence display unit S411 extracts other paths which have already been connected to the port 132 as the new connection destination of the path where the path switching operation has occurred from the path correspondence table 409, and displays a variation value to the user via the display apparatus 104 on the storage managing client 102. The above-described variation value is produced before/after the occurrence of the path switching operation of the command multiplex number distributed to the HBA 119 on the path extracted from the information stored in the command multiplex number distribution schedule table 417 and the command multiplex number distribution control table 406. Alternatively, the variation value may be displayed in a percentage, while a value before the occurrence of the path switching operation is defined as 100%.

The AP setting/forming unit S420 is initiated at such a timing when the path correspondence table 409 is updated (namely, timing when path switching operation occurs, while system switching operation in host server 106 is defined as opportunity), or is initiated by receiving a request issued from the storage managing software 126. The AP setting/forming unit S420 acquires structural information (for instance, if structural information is Web application program, then maximum log-in user number is set) of the AP 113 from the resource structural information; and the AP setting/forming unit S420 executes a proportional calculation by the percentage based upon the variation value of the command multiplex number acquired in a similar sequence to that of the distribution influence display unit S411 with respect to the path utilized by the AP 113 in order to calculate such a value obtained by adjusting the structural information (for instance, if structural information is Web application program, then maximum log-in user number is set) of the AP 113. For example, if the percentage of the variation value is equal to −50%, then the maximum log-in user number is restricted to the normal percentage of 50%.

Both the calculated value and a set value changing schedule time instant of the AP 113 are stored in the AP setting schedule table 419. The AP setting/updating control unit S418 is initiated at such a timing when the AP setting schedule table 419 is updated, or is initiated by receiving a request issued from the storage managing software 126, and notifies the structural information of the updated AP 113 to the AP setting/updating unit 117.

Figure 5:
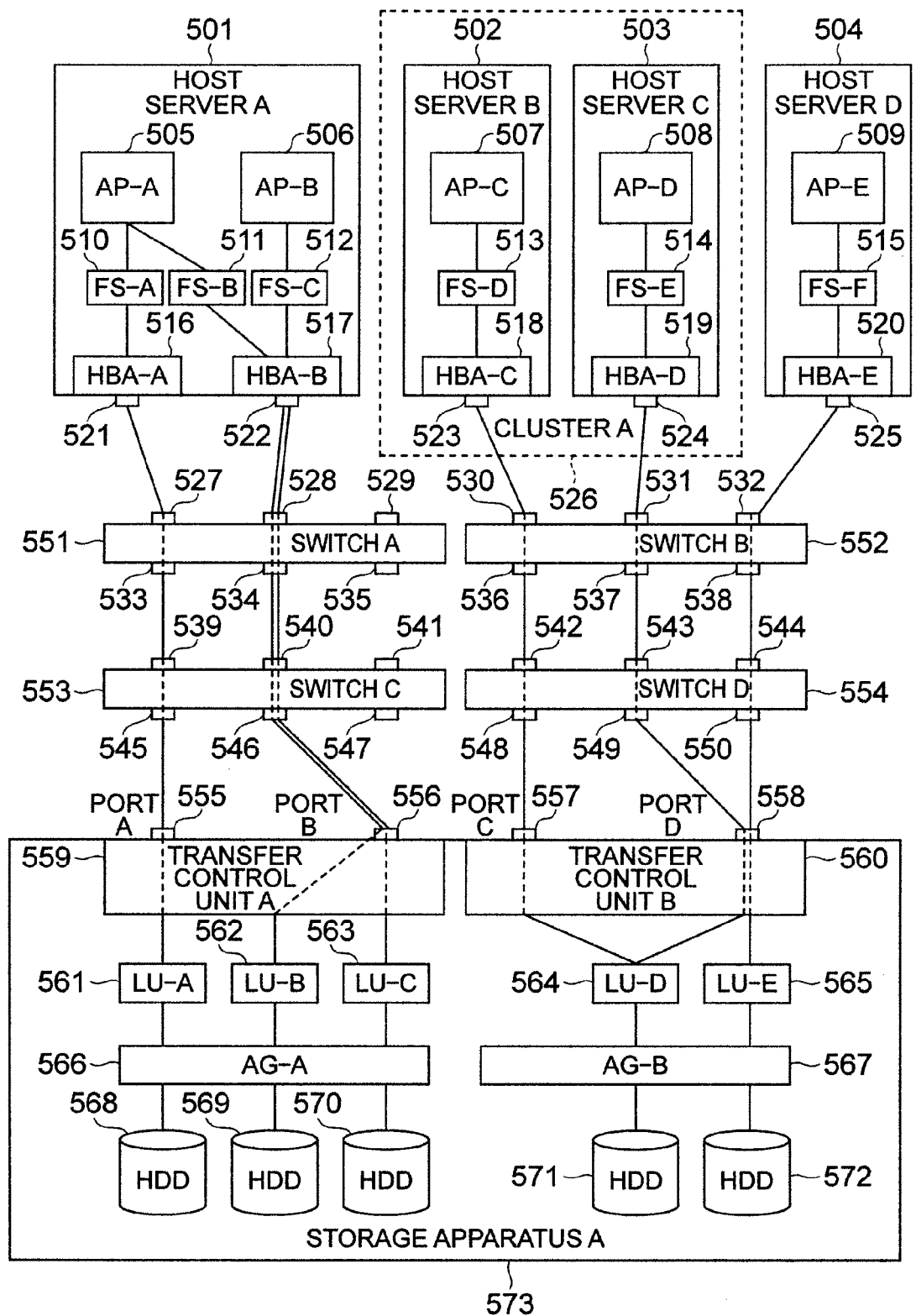
FIG. 5 is an explanatory diagram for showing a concrete example as to resources, a depending relation related to performance among the resources, and I/O paths.

FIG. 5 is an explanatory diagram for indicating a concrete example as to resources, a depending relation related to performance among the resources, and I/O paths. A resource implies such SAN structural elements that metric values are acquired in a grouped unit while performance of an SAN environment is monitored. Various sorts of resources are provided with respect to concrete hardware and concrete software respectively, which constitute the SAN. The resources present under the respective SAN environments have such a relation that influences on performance may be given to each other.

As shown in FIG. 5, the hardware of the SAN environment is arranged by four host servers 106, four SAN switches 129, and one storage apparatus 131 corresponding to a storage apparatus A(573). The four host servers 106 are a host server A(501), a host server B(502), a host server C(503), and a host server D(504). The four SAN switches 129 are a switch A(551), a switch B(552), a switch C(553), and a switch D(554). It is so assumed that in the host A(501), the AP motoring agent 111 (refer to FIG. 1) and the host monitoring agent 112 (refer to FIG. 1) are under operation in order to acquire business software, hardware of servers, and performance information of an OS (Operating System). This assumption may be similarly applied to other host servers.

Symbols "AP-A(505)" and "AP-B(506)" corresponding to application programs are one of resources which constitute information acquisition subjects by the AP monitoring agent 111. Also, symbols "FS-A(510)" to "FS-C(512)" corresponding to file systems, symbols "HBA-A(516)" and "HBA-B(517)", and a port (512) and a port (522) correspond to one example of the resources which constitute the information acquisition subjects by the host monitoring agent 112. A file system corresponds to such a unit that the OS provides an input/output service of data.

For example, a line which connects AP-A(505), FS-A(510), and FS-B(511) indicates such a relation that AP-A(505) issues an I/O to both FS-A(510) and FS-B(511), whereas a line which connects FS-A(510) to HBA-A(516) indicates such a relation that an I/O for FS-A(510) is issued via HBA-A(516). This relation implies that the below-mentioned depending relation about the performance is present. That is, while an I/O path is present between two resources, if a load given to one resource is increased, then a load given to the other resource is similarly increased.

It is so assumed that the storage monitoring agent 145 (refer to FIG. 1) is under operation in order to acquire the performance information of the storage apparatus A(573). As the resources which constitute the information acquisition subjects by this storage monitoring agent 145, there are ports (555 to 558), LU-A(561) to LU-E(565) corresponding to logical volumes, AG-A(566) to AG-B(567) corresponding to array groups, and physical HDDs (568 to 572).

An array group causes a plurality of physical hand disk drives to be logically represented as a single high-speed disk drive having higher reliability by a function of a storage sub-system. Also, a logical volume segments a single array group by the same function of the storage sub-system so as to cause the segmented array groups to be represented as a logical disk drive whose size is fitted to a usage of a host server. A file system of a host server is allocated to a logical volume of a storage apparatus, the logical volume is allocated to an array group, and the array group is allocated to a physical disk. As a result, a performance depending relation is established among these resources.

Also, if a pair is determined between a file system of a host server and a logical volume of a storage apparatus to which this file system is allocated, then such a path may be determined from a port of an HBA via a port of an SAN switch up to a port of a storage sub-system as a path for distributing input/output data which are sent/received between the file system and the logical volume. As a consequence, input/output loads given to the volume of the host server constitutes a communication load with respect to the ports on the path, so that there is a performance depending relation between the pair of the volume and the logical volume, and the ports on the path.

In the example shown in FIG. 5, FS-A(510) is allocated to LU-A(560). Also, LU-A(561) is allocated to AG-A(566); AG-A(566) is allocated to the physical HDDs (568 to 570); and such a path defined from the port 521 via the port 527, the port 533, the port 539, and the port 545 up to the port 555 correspond to the pair between the FS-A(510) and the storage apparatus A(573). An I/O load with respect to FS-A(510) which is utilized by the AP-A(505) reaches via an I/O path to the physical HDDs (568 to 570), while this I/O path is defined from the port 527, the port 533, the port 539, the port 545, the port 555, the LU-A(561), and the AG-A(566).

In such a case that path managing software (omitted in the drawing) having a load balance function has been conducted to the host server A(501), the below-mentioned arrangement may be alternatively established: That is, as an I/O path defined from AP-A(505) up to LU-A(561), such an I/O path defined from the port 522, the port 528, the port 534, the port 540, the port 546, the port 556, up to the LU-A(561) may be alternatively employed in addition to another I/O path defined from the port 521, the port 527, the port 533, the port 539, the port 545, the port 555, up to the LU-A(561). Then, I/O may be uniformly issued to the respective I/O paths in accordance with the path managing software.

While both the host server B(502) and the host server C(503) belong to a cluster A(526), redundancy is given to the host servers. In the cluster structure, while one host server provides a service based upon an application program, an application program of the other host server is brought into a stopping situation. In the case that a failure happens to occur in either hardware or software of such a host server which is providing a service, and such a situation occurs where an application program cannot continue to provide the service, the application program on the host server which is providing the service, and an application program on the other host server is initiated. It should also be noted that this operation will be referred to as "switching of system" hereinafter.

The data to which AP-C(507) and AP-D(508) refer and which is updated by these AP-C(503) and AP-D(508) is stored in LU-D(564), and then, when "switching of system" occurs, the data is transferred from the stopped application program to such an application program which is newly initiated. For instance, in such a case that a failure happens to occur in the host server B(502), and switching of the system to the host server C(503) occurs, the I/O path from FS-D(513) to LU-D(564) is interrupted, and the I/O path from FS-E(514) to LU-D(564) is newly connected. With respect to the port 558 present on the I/O path from FS-E(514) to LU-D(564), another I/O path from. FS-F(515) of the host server D(504) to LU-E(565) is separately present as a further I/O path routed via the port 558. While switching of the system is employed as an opportunity, the I/O path from FS-E(514) to LU-D(564) gives a load to the port 558, so that an influence on new performance may be given to the I/O path from FS-F(515) to LU-E(565).

Next, a description is made of various sorts of tables with reference to FIG. 5, if required.

FIG. 6 is an explanatory diagram for showing one example as to the structure of the resource statistical information table 402. In the resource statistical information table 402, resource statistical information has been stored which has been collected by the host monitoring agent 112 and the storage monitoring agent 145. FIG. 6 represents such an example that averaged values per unit time as to simultaneous command issue numbers every path have been stored, while the simultaneous command issue numbers every path have been monitored by the host monitoring agent 112. In the example indicated in FIG. 6, the resource statistical information table 402 contains a number column 601, a host server column 602, an LU column 603, a simultaneous command issue number column 604, and a collecting time instant column 605. For example, in accordance with the number #1, the host server A(501) can grasp that the simultaneous command issue number is equal to 101 in the path with LU-A(561).

Next, various sorts of tables shown in FIG. 34 will now be described with reference to FIG. 7 to FIG. 13. It should be noted that FIG. 5 will be properly observed, if necessary. FIG. 7 to FIG. 13 represent concrete examples as to structural information related to either hardware or software present within a storage system stored in the resource structural information table 407.

Among the above-described structural information, FIG. 7 to FIG. 10 represent concrete examples as to tables which store thereinto a relation of [users]–[using subjects] as to LU 138 present on the storage apparatus 131 and AP 113 which is utilized by information present on the LU 138. It should also be noted that the respective tables shown in FIG. 7 to FIG. 10 may be alternatively arranged in such a manner that the respective tables are joined to each other to be stored in a single table.

FIG. 7 is an explanatory diagram for indicating the HBA-file system relation table 700. The HBA-file system relation table 700 corresponds to a concrete example as to such a table which has stored thereinto a relation between the HBAs and the file system. The HBA-file system relation table 700 contains a host server column 701, an HBA column 702, and a file system column 703. For example, the relation table 700 of FIG. 7 represents that HBA-A(516) and HBA-B(517) are present in the host server A(501); an I/O is issued from HBA-A(516) to the file system A(510); and an I/O is issued from HBA-B(517) to the file system FS-B(511) and the file system FS-C(512).

FIG. 8 is an explanatory diagram for indicating the application (AP) program-file system relation table 800. The application (AP) program-file system relation table 800 corresponds to a concrete example as to such a table which has stored thereinto a relation between application programs and file systems. The application (AP) program-file system relation table 800 contains a host server column 801, an AP column 802, and a file system column 803. For instance, the relation table 800 of FIG. 8 indicates that the application AP-A(505) and the application AP-B(506) are present in the host server A(501); the application AP-A(505) stores business data into the file system FS-A(510) and the file system FS-B(511); and the application AP-B(506) stores business data into the file system. FS-C(512).

FIG. 9 is an explanatory diagram for indicating the file system-storage apparatus relation table 900. The file system-storage apparatus relation table 900 corresponds to a concrete example as to a table which has stored thereinto a relation between file systems and storage apparatuses. The file system-storage apparatus relation table 900 contains a host server column 901, a file system column 902, a storage apparatus column 903, and a port column 904. For example, the relation table 900 of FIG. 9 indicates that a file system FS-A (510), a file system FS-B(511), and a file system FS-C(512) are present in the host server A(501); and an I/O to the file system FS-A(510) utilizes a storage area within the storage apparatus A(573) via the port A(555) of the storage apparatus A(573).

FIG. 10 is an explanatory diagram for showing the storage apparatus-LU relation table 1000. The storage apparatus-LU relation table 1000 corresponds to a concrete example of such a table which has stored thereinto a relation between storage apparatuses and LUs. The storage apparatus-LU relation table 1000 contains a storage apparatus column 1001, a port column 1002, and an LU column 1003. The relation table 1000 of FIG. 10 represents that, for instance, a port C(557) and a port D(558) are present in the storage apparatus A(501); and an I/O which has been issued with respect to LU-D(564) is received by either the port C(557) or the port D(558). In other words, this concrete example is such an example that the I/O paths have been formed in a dual mode.

FIG. 11 is an explanatory diagram for indicating the host server-to-cluster relation table 1100. The host server-cluster relation table 1100 corresponds to a concrete example as to such a table which stores thereinto a relation between cluster names (logical host names) and host server names (physical host names) in such a case that host servers constitute clusters. In the host servers having the cluster structures, any one of the host servers contained in the cluster group becomes an ON-line (executing system), and other remaining host servers become an OFF-line (waiting system). The host server-cluster relation table 1100 contains a host server column 1101, a cluster column 1102, and an identifier column 1103 for identifying whether or not a host server corresponds to the executing system. For instance, in the example shown in FIG. 11, the host server B(502) belongs to the cluster A(526) and corresponds to the executing system, whereas the host server C(503) belongs to the cluster A(526) and corresponds to the waiting system. The identifier for identifying whether or not a host server corresponds to the executing system will be later utilized as a distribution condition when a distribution amount of command multiplex number is calculated is calculated.

FIG. 12 is an explanatory diagram for representing the command multiplex number upper limit table 1200 of the storage apparatus-sided port. The command multiplex number upper limit table 1200 of the storage apparatus-sided port corresponds to such a table which stores thereinto command multiplex number upper limit values of the respective ports provided on the storage apparatuses. The command multiplex number upper limit value table 1200 contains a storage apparatus column 1201, a port column 1202, and a command multiplex number upper limit column 1203. For example, the table 1200 of FIG. 12 represents that a port A(555), a port B(556), a port C(557), and a port D(558) are present in the storage apparatus A(573); and upper limit numbers as to respective commands which can be processed at the same time are 256, respectively.

FIG. 13 is an explanatory diagram for showing the AP structural information table 1300. The AP structural information table 1300 corresponds to such a table which stores thereinto structural information of a business application (AP) program. The AP structural information table 1300 contains a host server column 1301, an AP column 1302, a definition value column 1303 of maximum log-in user numbers and a present value column 1304 of the maximum log-in user numbers. For instance, in the host server A(501), while both AP-A(505) and AP-B(506) are under execution, both a definition value and a present value of maximum log-in user number set to each of business application programs have been stored. A defined value implies the highest expectable capability value which is given during initial setting operation, whereas a present value implies such a value which has been presently set. There are some possibilities that as to the present value, an optimum value may be dynamically set by considering a load given to a storage apparatus, and such a value which is different from a definition value may be set.

FIG. 14 is an explanatory diagram for indicating the AP setting schedule table 419. The AP setting schedule table 419 corresponds to such a table which stores thereinto distribution scheduling time instants (control scheduling time instants) for setting/updating application programs. The AP setting schedule table 419 contains a number column 1401, a distribution scheduling time instant column 1402, a distribution completing time instant column 1403, a host server column 1404, an AP column 1405, and a control value column 1406 of maximum log-in user number. In addition to the distribution scheduling time instant column 1402, distribution completing time instants have been saved in the distribution completing time instant column 1403 in order to save distribution execution histories. For example, AP-A(505) of the host server A(501) indicates that the maximum log-in user number has been controlled from 20,000 accounts (refer to FIG. 13) to 18,000 accounts in response to a change amount of command multiplex number distribution amounts. It should also be noted that as will be discussed in FIG. 17 and FIG. 18, another structure may be alternatively constructed in which the distribution scheduling time instants and the information of the setting values may be held in separated tables.

In the example of FIG. 15, the below-mentioned structure has been explained: That is, priority order information of the respective LUs is merged which has been stored in distribution ordering condition table 403 (will be discussed later), and, then the merged information is added as a condition for calculating distribution amounts of the respective paths. In such a case that a host server takes a cluster structure, only a path of a host server which presently constitutes an executing system is extracted. For instance, in such a case that the host server B of the cluster A constitutes the executing system and the host server C constitutes the waiting system in the structure of FIG. 5, the path information of the host server C is not extracted. The reason why this path information is not extracted is given as follows: That is, the path which is utilized by the host server C is not used until the system switching operation occurs.

FIG. 16 is an explanatory diagram for indicating the distribution ordering condition table 403. The distribution ordering condition table 403 corresponds to such a table which applies priority orders to the respective LUs in addition to an automatic command multiplex number distribution based upon statistical information, and is utilized as an automatic distribution moving subject volume selecting condition in response to a temporary load increase of a resource. The distribution ordering condition table 403 contains a number column 1601, an LU column 1602, a priority degree column 1603, and a band guarantee column 1604. In the priority degree column 1603 shown in FIG. 16, while the entire portion of the storage apparatus A of FIG. 5 is defined as 100%, such values have been inputted that business priority degrees of the respective LUs have been set based upon the percentage. A system manager sets the values of the priority degree column 1603 via the priority order setting unit S404.

Alternatively, an attribute for designating such a volume that a constant distribution amount is wanted to be guaranteed, or for designating such a volume except for an automatic distribution moving subject may be additionally provided so as to be added to the command multiplex number distribution condition. FIG. 5 indicates such an example that while the band guarantee column 1604 is additionally provided, the LU which is required to be guaranteed is excluded from the automatic distribution moving subject when a path switching operation is employed as an opportunity. The system manager sets the value of the band guarantee column 1604 via the priority order setting unit S404 of FIG. 4.

FIG. 17 is an explanatory diagram for indicating the command multiplex number distribution control table 406. The command multiplex number distribution control table 406 contains a number column 1701, a host server column 1702, an HBA column 1703, an LU column 1704, and a command multiplex number distribution amount column 1705. Values listed in the command multiplex number distribution amount column 1705 with respect to the respective paths are given as setting values of the HBA column 1703. An upper value of the command multiplex issue numbers must be set with respect to each of the LUs connected to the HBA based upon the path definition of the path managing software 115. As a consequence, a distribution amount of command multiplex numbers is allocated every combination of a host, an HBA, and an LU.

FIG. 18 is an explanatory diagram for showing the command multiplex number distribution schedule table 417. The command multiplex number distribution schedule table 417 is such a table which stores thereinto distribution scheduling time instants (execution scheduling time instants) of command multiplex number distributions. The command multiplex number distribution schedule table 417 contains a number column 1801, a distribution scheduling time instant column 1802, and a distribution completing time instant column 1803. The number column 1801 corresponds to the above-described number column 1701 of FIG. 17. This schedule table 417 has such a structure that distribution completing time instants are saved in the distribution completing time instant column 1803 in order to save a distribution execution history in addition to the distribution scheduling time instants of the distribution scheduling time instant column 1802.

FIG. 19 is an explanatory diagram for indicating the external storage correspondence table 413. The external storage correspondence table 413 corresponds to such a table which stores thereinto a correspondence relation between mapping destination storage apparatuses and mapping source storage apparatuses with respect to LUs which have been mapped from an externally-connected storage apparatus. The external storage correspondence table 413 contains a number column 1901, a mapping destination schedule apparatus column 1902, an LU column 1903, a mapping source storage apparatus column 1904, and another LU column 1905. For instance, the correspondence table 413 of FIG. 19 represents that in accordance with the number #1, LU-H mapped from an external storage is present in the storage apparatus "A"; I/O to LU-H is transferred to the mapping source externally-connected storage apparatus "B", and then, is processed as I/O to be supplied to LU-L.

FIG. 20 is an explanatory diagram for showing the mirror volume correspondence table 416. A mirror volume implies such a volume to which a content of a certain logic volume has been duplicated. In the mirror volume, there are a synchronous copy system and an asynchronous system. In the synchronous copy system, an I/O to a main volume (namely, primary volume) is immediately reflected onto a sub-volume (namely, secondary volume) so as to continuously keep the main/sub-volumes under the same situations. In the asynchronous system, the content of the main volume is copied in a periodic manner so as to save snap shots. In such a case that such an operation in which both a host server and an LU have been duplicated is carried out so as to give redundancy to a business system, the synchronous system capable of continuously keeping the main/sub-volumes under the same situations.

The mirror volume correspondence table 416 contains a number column 2001, a primary volume column 2002, a primary site column 2003 of a storage apparatus, a secondary volume column 2004, a secondary site column 2005 of the storage apparatus, and a copy system column 2006. In the example of FIG. 20, the correspondence table 416 represents that a primary volume "P" of a storage apparatus "A" has a synchronous copy relation with a secondary volume "T" of a storage apparatus "B."

Next, a description is made of process operations as to the respective units with reference to FIG. 21 to FIG. 32, while referring to FIG. 4 in a proper manner.

FIG. 21 is a flow chart for describing a process operation of the command multiplex number distribution forming unit S410. The command multiplex number distribution forming unit S410 executes such a process operation for distributing a command multiplex number to respective paths connected to ports in order to demonstrate a command execution capability as to the ports of the storage apparatus. The command multiplex number distribution forming unit S410 repeatedly executes process operations defined from a step S2102 to a step S2107 every port of the storage apparatus, and if there is no subject port in the storage apparatus, then the command multiplex number distribution forming unit S410 accomplishes the process operation (step S2101). In a step S2102, a command multiplex number upper limit value as to the storage apparatus-sided port is acquired from the storage structural information table 407. In a step S2103, a list of paths connected to the storage apparatus-sided port is acquired from the path correspondence table 409.

In a step S2104, a list of simultaneous command issue numbers every path is acquired from the resource statistical information table 402. In a step S2105, a calculation is made of such values that the command multiplex number upper limit value of the storage apparatus-side port is proportionally distributed to the respective paths based upon the simultaneous command issue number acquired in the step S2104. In a step S2106, the command multiplex number distribution amount calculated in the step S2105 is stored in the command multiplex number distribution control table 406.

In a step S2107, a command multiplex number distribution executing time instant is stored in the command multiplex number distribution schedule table 417. For instance, if the command multiplex number distribution is immediately executed, then the present time instant is stored as the execution time instant in the command multiplex number distribution schedule table 417.

Figure 22:
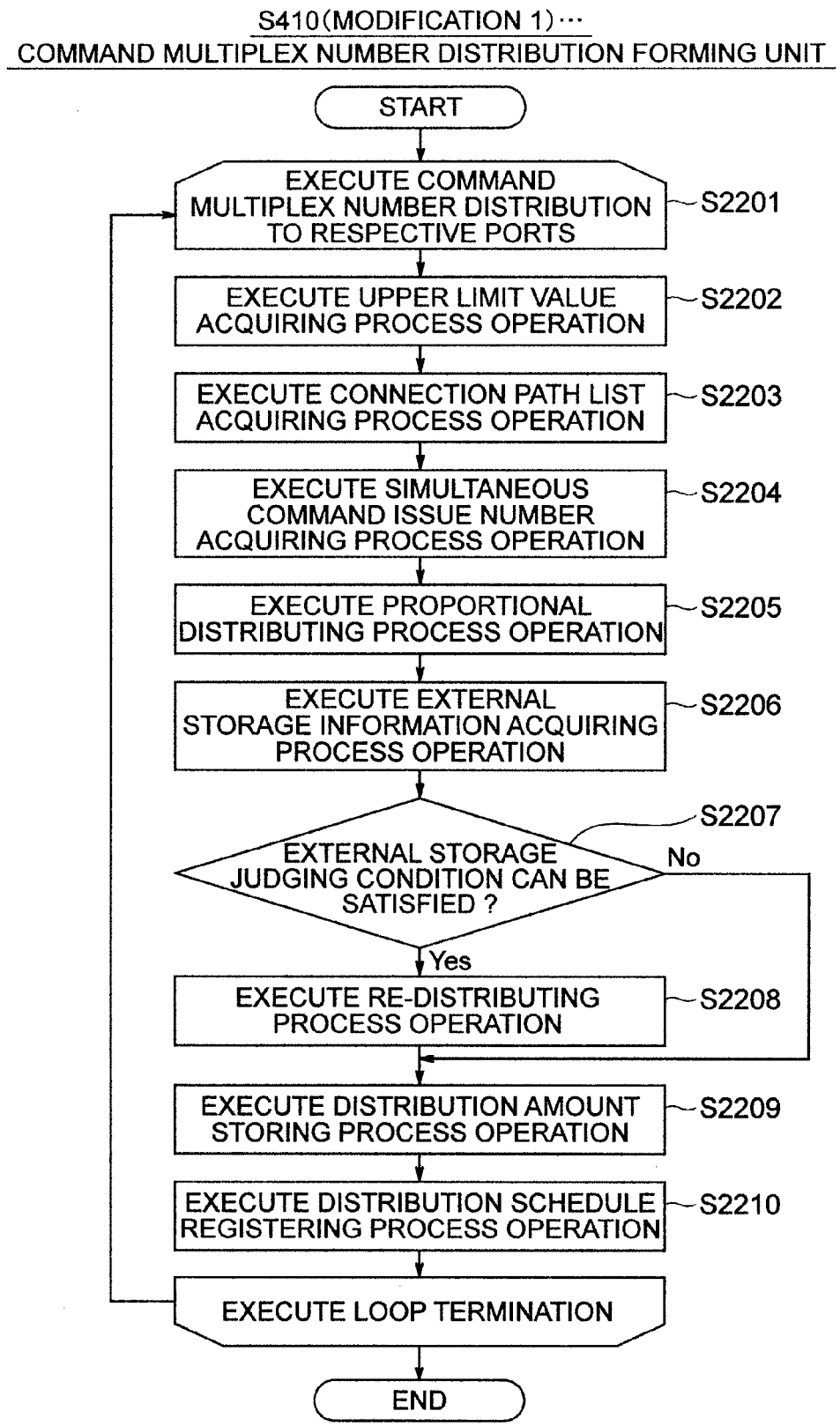
FIG. 22 is a flow chart for describing a modification 1 of the command multiplex number distribution forming unit.

FIG. 22 is a flow chart for describing a modification 1 of the command multiplex number distribution forming unit S410. In FIG. 22, process steps in such a case that an external storage apparatus has been connected (step S2206 to step S2208) has been additionally employed in the flow chart of FIG. 21.

The command multiplex number distribution forming unit S410 repeatedly executes process operations defined from a step S2202 to a step S2210 every port of the storage apparatus, and if there is no subject port, then the command multiplex number distribution forming S410 accomplishes the process operation (step S2201). In a step S2202, a command multiplex number upper limit value as to the storage apparatus-sided port is acquired from the storage structural information table 407. In a step S2203, a list of paths connected to the storage apparatus-sided port is acquired from the path correspondence table 409. In a step S2204, a list of simultaneous command issue numbers every path is acquired from the resource statistical information table 402. In a step S2205, a calculation is made of such values that the command multiplex number upper limit value of the storage apparatus-side port is proportionally distributed to the respective paths based upon the simultaneous command issue number acquired in the step S2204.

In a step S2206, a command multiplex number upper limit value of the port of the external storage apparatus is acquired with respect to LU mapped from the external storage apparatus. In a step S2207, a judgement is made whether or not external storage judging conditions can be satisfied. If all of the external storage judging conditions are truth ("yes" in step S2207), then the process operation is advanced to a step S2208. If any one, or both of the external storage judging conditions is false ("NO" in step S2207), then the process operation is advanced to a step S2209.

The external storage judging conditions are indicated as follows:

Condition 1: The LU which should be presently processed corresponds to the LU mapped from the external storage apparatus.

Condition 2: (distribution amount calculated in step S2205)>(command multiplex number upper limit value of port of external storage apparatus).

In a step S2208, a distribution amount to the LU should be presently processed is set to (command multiplex number upper limit value of port of external storage apparatus), a distribution amount to LUs other than the above-described LU which should be presently processed is again proportionally distributed in the sequential operation of the step S2206.

In a step S2209, the command multiplex number distribution amount calculated in the step S2205, or the step S2208 is stored in the command multiplex manner distribution control table 406. In a step S2210, a command multiplex number distribution executing time instant is stored in the command multiplex number distribution schedule table 417. For instance, if the command multiplex number distribution is immediately executed, then the present time instant is stored as the execution time instant in the command multiplex number distribution schedule table 417.

Figure 23:
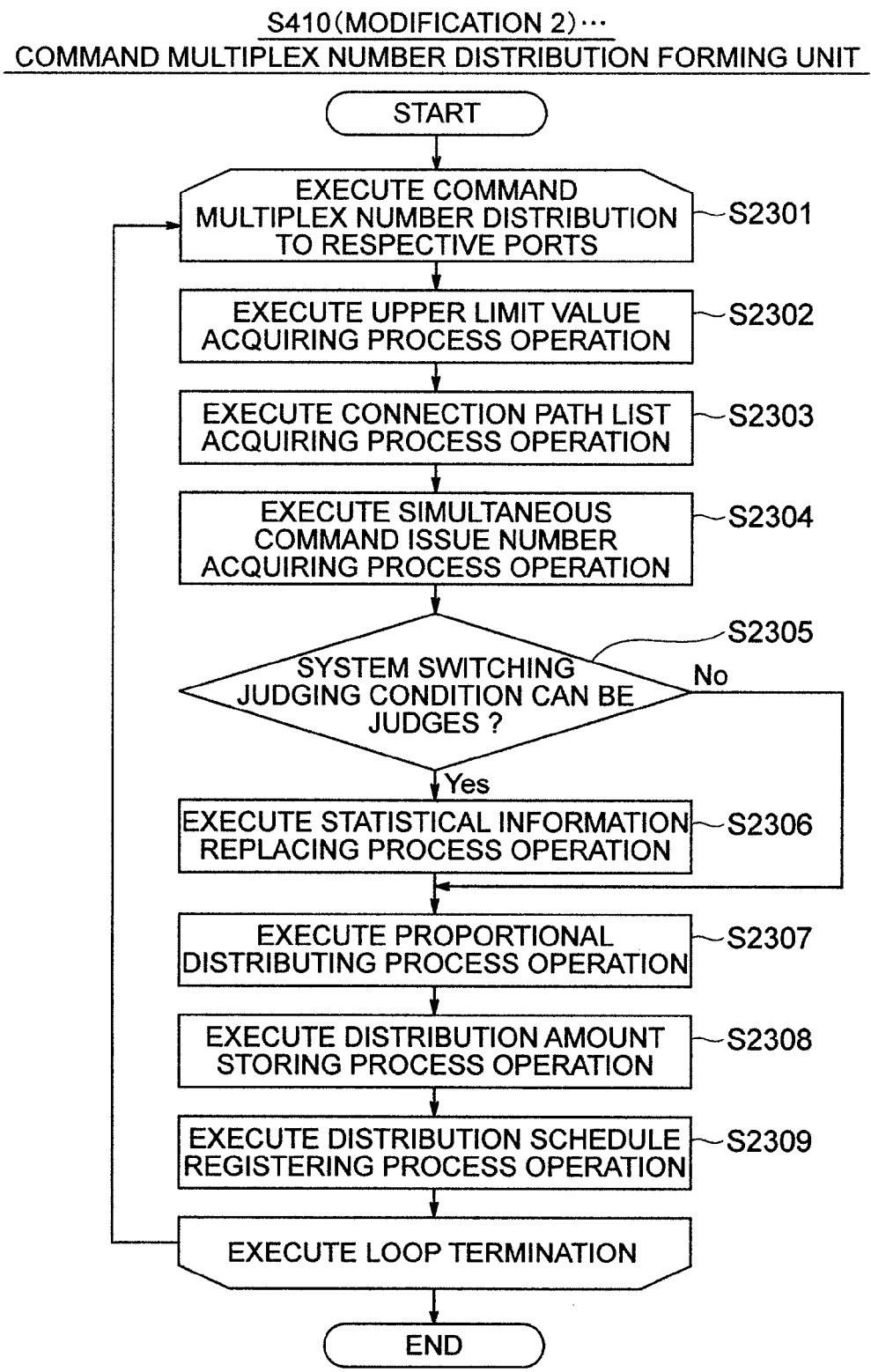
FIG. 23 is a flow chart for describing a modification 2 of the command multiplex number distribution forming unit.

FIG. 23 is a flow chart for describing a modification 2 of the command multiplex number distribution forming unit S410. In FIG. 23, process steps in such a case that a mirror volume has been present (step S2305 and step S2308) has been additionally employed in the flow chart of FIG. 21.

The command multiplex number distribution forming unit S410 repeatedly executes process operations defined from a step S2302 to a step S2309 every port of the storage apparatus, and if there is no subject port, then the command multiplex number distribution forming unit S410 accomplishes the process operation (step S2301). In a step S2302, a command multiplex number upper limit value as to the storage apparatus-sided port is acquired from the storage structural information table 407. In a step S2303, a list of paths connected to the storage apparatus-sided port is acquired from the path correspondence table 409. In a step S2304 a list of simultaneous command issue numbers every path is acquired from the resource statistical information table 402.

In a step S2305, a judgement is made whether or not system switching judging conditions can be satisfied. If all of the system switching judging conditions are truth ("Yes" in step S2305), then the process operation is advanced to a step S2306. If any one, or both of the system switching judging conditions is false ("No" in step S2305), then the process operation is advanced to a step S2307.

The system switching conditions are given as follows:

Condition 1: A re-distribution is executed while a path switching operation is employed as an opportunity.

Condition 2: A path was newly connected to a secondary volume under mirroring operation (I/O path was transferred from primary volume to secondary volume).

In a step S2306, among the simultaneous command issue numbers every path acquired in the step S2304, simultaneous command issue number statistical information of the secondary volume is replaced by statistical information of the primary volume which was utilized just before the system switching operation. Since there is no I/O in the secondary volume just before the system switching operation, the statistical information of the primary volume is utilized so as to calculate a distribution amount.

In a step S2307, such values are calculated that the command multiplex number upper limit value of the storage apparatus-sided port is proportionally distributed to the respective paths based upon the simultaneous command issue numbers in the step S2304 and S2306. In a step S2308, the command multiplex number distribution amount calculated in the step S2307 is stored in the command multiplex distribution control table 406. In a step S2309, a command multiplex number distribution executing time instant is stored in the command multiplex number distribution schedule table 417. For instance, if the command multiplex number distribution is immediately executed, then the present time instant is stored as the execution time instant in the command multiplex number distribution schedule table 417.

Figure 24:
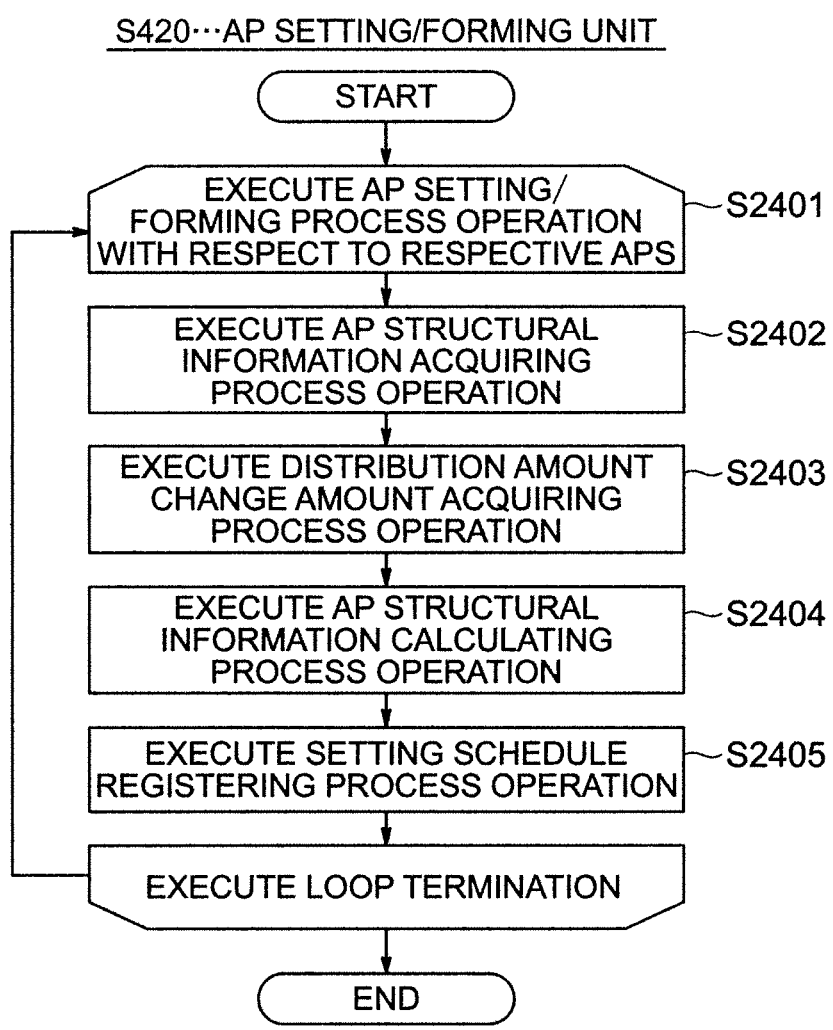
FIG. 24 is a flow chart for describing a process operation of an AP setting/forming unit.

FIG. 24 is a flow chart for describing a process operation of the AP setting/forming unit S420. The AP setting/forming unit S420 executes an automatic control process operation as to structural information of an application (AP) program based upon a change amount of command multiplex number amounts. The AP setting/forming unit S420 repeatedly executes process operations defined from a step S2402 to a step S2405 every AP, and if there is no subject AP, then the AP setting/forming unit S420 accomplishes the process operation (step S2401). In a step S2402, the structural information of the application program is acquired from the resource structural information table 407. In a step S2403, both a command multiplex number distribution amount and another command multiplex number distribution amount before and after the command multiplex number distribution amount for the path which is utilized by the application program is controlled are acquired from the command multiplex number distribution control table 406.

In a step S2404, for example, a new setting value of the application program is calculated based upon the below-mentioned calculation formula. The calculation formula for calculating an application set value (for example, maximum log-in user number) is expressed by the following formula (A2):

(distribution amount after command multiplex number is controlled)/(distribution amount before command multiplex number is controlled)×(defined value for log-in user number of application program) (A2).

In a step S2405, the application setting control value calculated in the step S2404, and the set update scheduling time instant are stored in the AP setting schedule table 419. For example, if the AP setting/forming operation is immediately executed, then the present time instant is stored as the update scheduling time instant.

Figure 25:
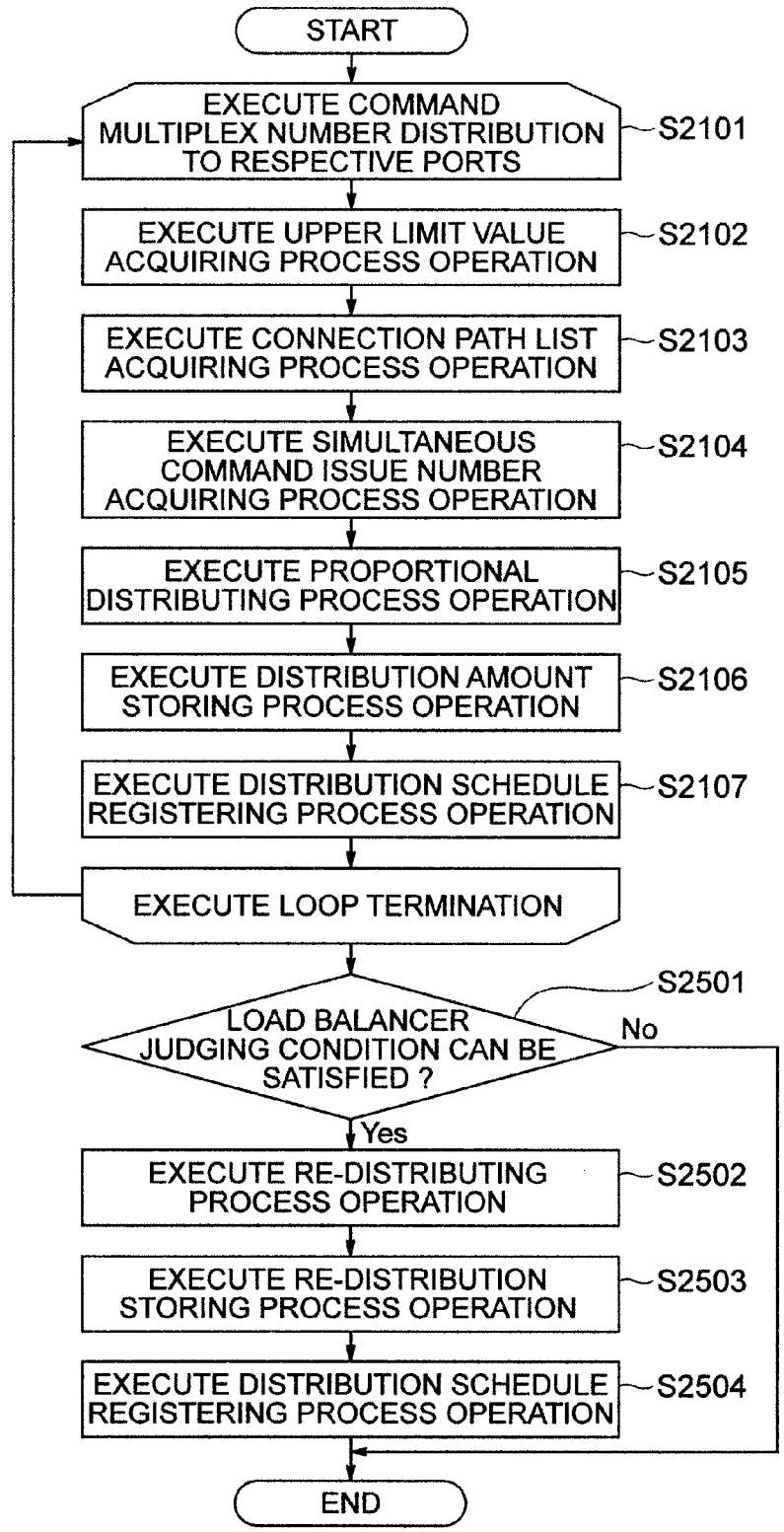
FIG. 25 is a flow chart for describing a modification 3 of the command multiplex number distribution forming unit.

FIG. 25 is a flow chart for describing a modification 3 of the command multiplex number distribution forming unit S410. In FIG. 25, process steps in such a case that a load-balanced path is present (step S2501 to step S2504) has been additionally provided in the flow chart (step S2102 to step S2107) of FIG. 21. It should be understood that the process operations defined from the step S2102 to the step S2107 will be omitted.

In a step S2501, the command multiplex number distribution forming unit S410 judges whether or not the below-mentioned load balancer judging condition can be satisfied. If the below-mentioned load balancer judging condition is truth ("YES" in step S2501), then the process operation is advanced to a step S2502. If the load balancer judging condition is false ("NO" in step S2502), then the process operation is accomplished:

Load balancer condition: There are paths which have been multiplexed by the load balancer within the storage system which should be monitored.

In a step S2502, within the command multiplex number distribution amounts allocated in the step S2105, such distribution amounts allocated to the multiplexed paths are extracted, and then, a maximum distribution amount among the extracted distribution amounts is uniformly distributed to the multiplexed paths. The remaining command multiplex distribution amount obtained as a result of uniform distribution is again proportionally distributed to other paths in accordance with the sequential operation of the step S2105. For example, assuming now that as paths from the host server "A" to "E" are present, a maximum distribution amount (for example, distribution amount "Cn" to path "C") within distribution amounts allocated to the paths "A" to "E" as a result of the command multiplex number distributions in FIG. 21 is uniformly distributed to the paths "A" to "E" (namely, all distribution amounts to paths "A" to "E" are changed into distribution amount "Cn"), and also, as to the respective ports of the storage apparatus existing on the paths "A" to "E", a command multiplex number upper limit value except for the distribution amounts allocated to the paths "A" to "E" is again proportionally distributed to other paths.

In a step S2503, the command multiplex number distribution amount calculated in the step S2502 is stored in the command multiplex number distribution control table 406. In a step S2504, a command multiplex number distribution executing time instant is stored in the command multiplex number distribution schedule table 417. For instance, if the command multiplex number distribution is immediately executed, then the present time instant is stored as the execution time instant in the command multiplex number distribution schedule table 417. However, this process operation has already been carried out in FIG. 21, so that if there is no change in the schedule, then this process operation may be alternatively omitted.

Figure 26:
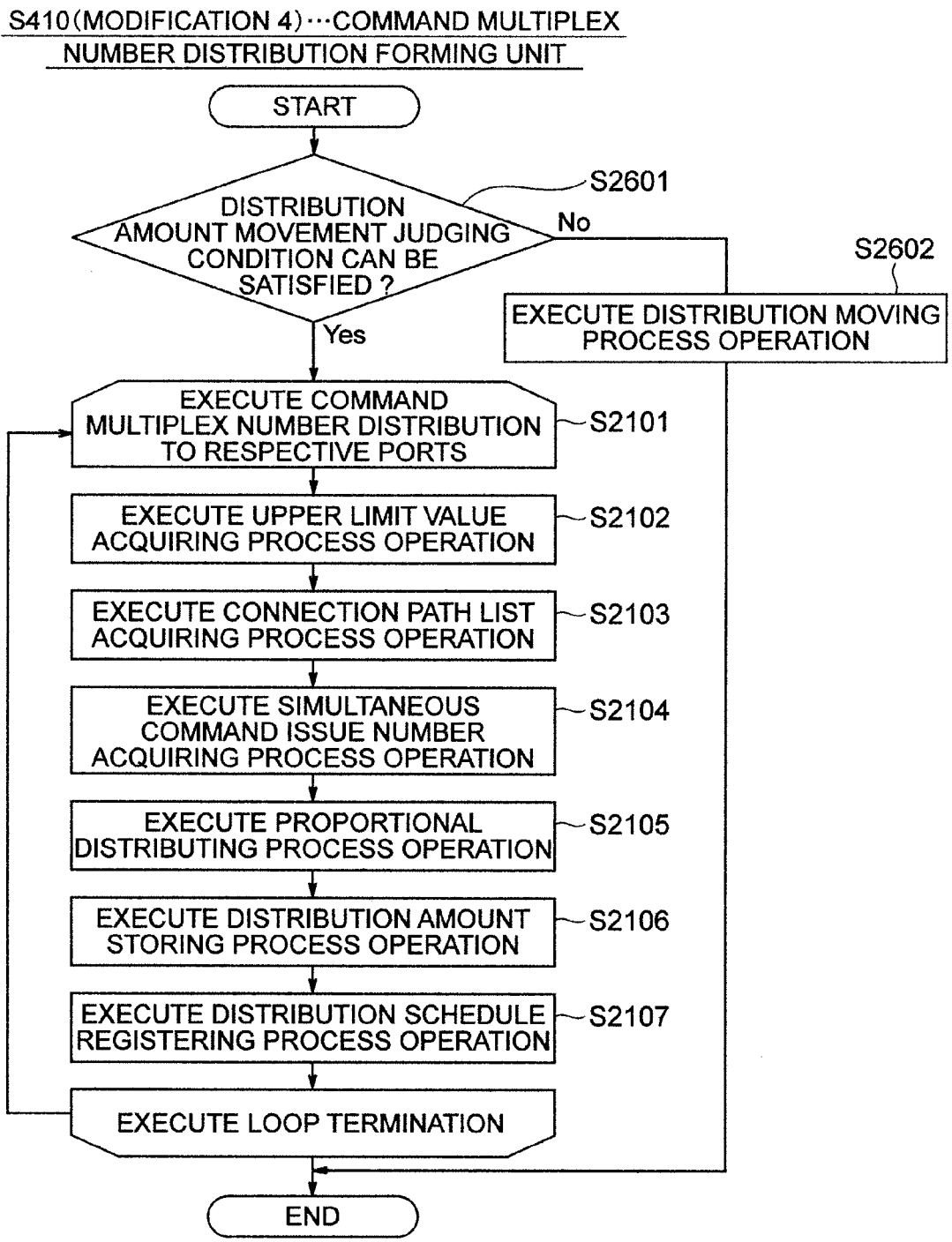
FIG. 26 is a flow chart for describing a modification 4 of the command multiplex number distribution forming unit.

FIG. 26 is a flow chart for describing a modification 4 of the command multiplex number distribution forming unit S410. In FIG. 26, process steps in such a case that a simultaneous command issue number of a path reaches an upper limit value allocated to the HBA 119 (step S2601 and step S2602) have been additionally employed in the flow chart (step S2101 to step S2107) of FIG. 21. It should also be noted that a description will be omitted as to the step S2101 to the step S2107.

In a step S2601, the command multiplex number distribution forming unit S410 judges whether or not the below-mentioned distribution amount movement judging conditions can be satisfied. If the below-mentioned distribution amount movement judging conditions are truth ("Yes" in step S2601), then the process operation is advanced to a step S2602. If any one, or both the distribution amount judging condition is false ("No" in step S2601), then the process operation is advanced to a step S2101.

The above-described distribution amount movement judging conditions are expressed as follows:

Condition 1: There is such a path whose command multiplex number has reached an upper limit value of a distributed command multiplex number.

Condition 2: There is such a path which is routed via the same port as the port of the storage apparatus located on path corresponding to the above-described condition 1.

Condition 3: A priority level of an LU connected to the path corresponding to the above-described condition 2 is lower than a priority level of such an LU whose command multiplex number has reached the upper limit value.

In a step S2602, a partial amount of a distribution amount distributed to LU (LU-B) corresponding to the condition 3 of the step S2601 is moved to such an LU (LU-A) connected to the path corresponding to the condition 1 of the step S2601 based upon the below-mentioned calculation formula (A3). For example, within the command multiplex number distribution amount of the LU-B, such a distribution amount which has not yet been utilized is moved to the LU-A.

(distribution amount of LU-B)−(averaged value per unit time, which is acquired from simultaneous command issue number statistical information of LU-B) (A3).

Figure 27:
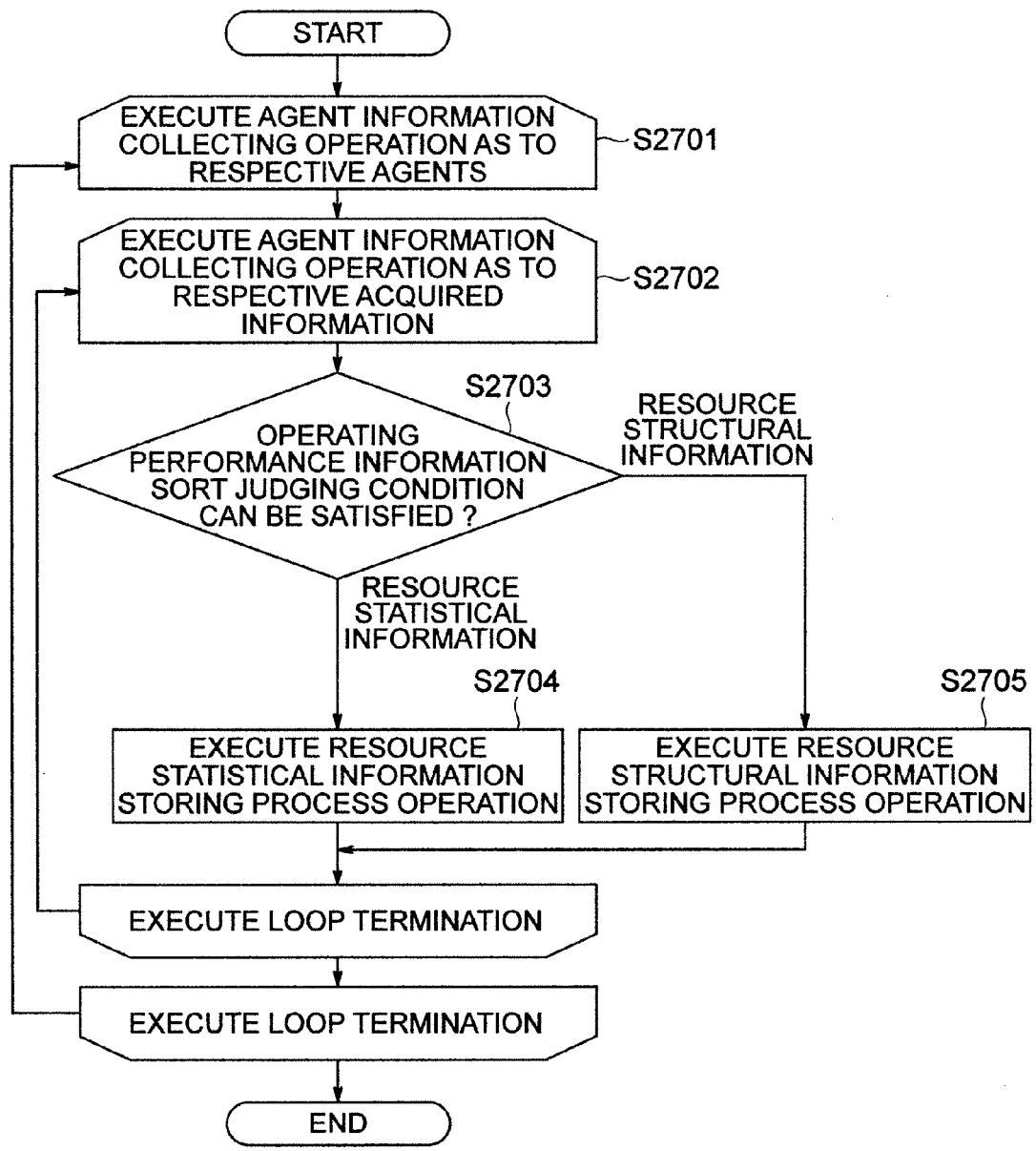
FIG. 27 is a flow chart for indicating a process operation of an agent information collecting unit.

FIG. 27 is a flow chart for describing a process operation of the agent information collecting unit S401. In a step S2701, the agent information collecting unit S401 repeatedly performs a process operation every agent (which contains storage monitoring agent, host monitoring agent, and AP monitoring agent); and in a step S2702, the agent information collecting unit S401 repeatedly performs a process operation every operating performance information (resource statistical information and resource structural information) acquired by the agent.

The agent information collecting unit S401 judges whether or not an operating performance information sort judging condition can be satisfied in a step S2703. In this case, the above-described operating performance information sort judging condition implies that the operating performance information acquired by the agent is resource statistical information. In such a case that the operating performance information sort judging condition is truth (namely, "resource statistical information" in step S2703), the process operation is advanced to a step S2704. In the case where that the operating performance information sort judging condition is false (namely, "resource structural information" in step S2703), the process operation is advanced to a step S2705.

In the step S2704, the resource statistical information acquired by the agent is stored in the resource statistical information table 402. In the step S2705, the resource structural information acquired by the agent is stored in the resource structural information table 407.

Figure 28:
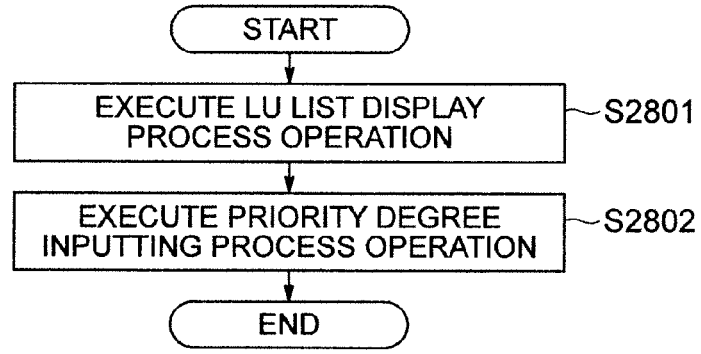
FIG. 28 is a flow chart for showing a process operation of a priority order setting unit.

FIG. 28 is a flow chart for describing a process operation of the priority order setting unit S404. In a step S2801, the priority order setting unit S404 displays an LU list with respect to the storage managing client 102 based upon the information saved in the storage apparatus-LU relation table 1000 (refer to FIG. 10) of the resource structural information table 407. In the LU list, priority degrees are contained as information required to be stored in the distribution ordering condition table 403. Alternatively, such a column for entering band guarantees may be additionally provided. In a step S2802, both a priority degree and a band guarantee value which have been inputted with respect to the LU list displayed in the step S2801 are stored in the distribution ordering condition table 403, and then, the process operation is accomplished.

Figure 29:
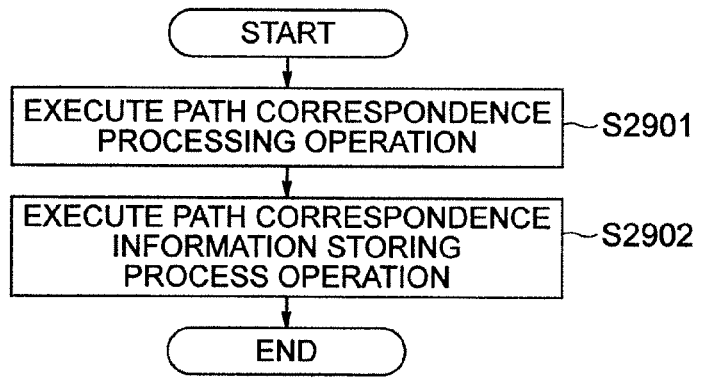
FIG. 29 is a flow chart for representing a process operation of a path correspondence retrieving unit.

FIG. 29 is a flow chart for describing a process operation of the path correspondence retrieving unit S408. In a step S2901, the path correspondence retrieving unit S408 couples various sorts of tables (refer to FIG. 7 to FIG. 13) including the resource structural information from the resource structural information table 407 to each other so as to construct a single table, and then stores the single table as temporary information in either the memory 125 or the HDD 124. In a step S2902, the coupling result of the resource structural information produced in the step S2901 is stored in the path correspondence table 409, and the temporary information saved in either the memory 125 or the HDD 124 is deleted, and then, the process operation is accomplished.

Figure 30:
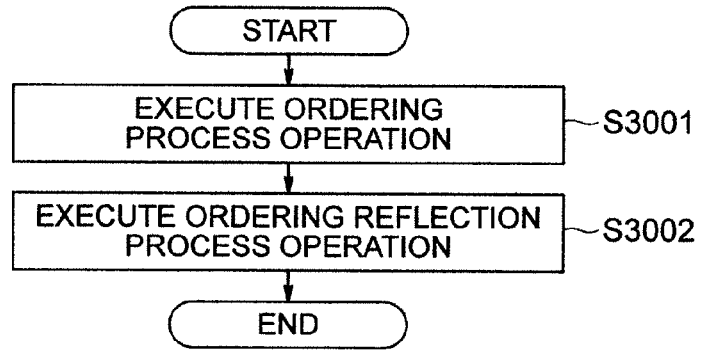
FIG. 30 is a flow chart for representing a process operation of a distributed moving candidate selecting/ordering unit.

FIG. 30 is a flow chart for describing a process operation of the distributed moving candidate selection ordering unit S405. In a step S3001, the distributed moving candidate selection ordering unit S405 couples ordering information (priority degree and band guarantee) every LU stored in the distribution ordering condition table 403 to the path correspondence table 409 so as to construct a single table, and then stores this single table as temporary information in either the memory 125 or the HDD 124. In a step S3002, the coupling result between the path correspondence table 409 and the ordering information every LU produced in the step S3001 is stored in the path correspondence table 409; and the temporary information saved in either the memory 125 or the HDD 124 is deleted; and then, the process operation is accomplished.

Figure 31:
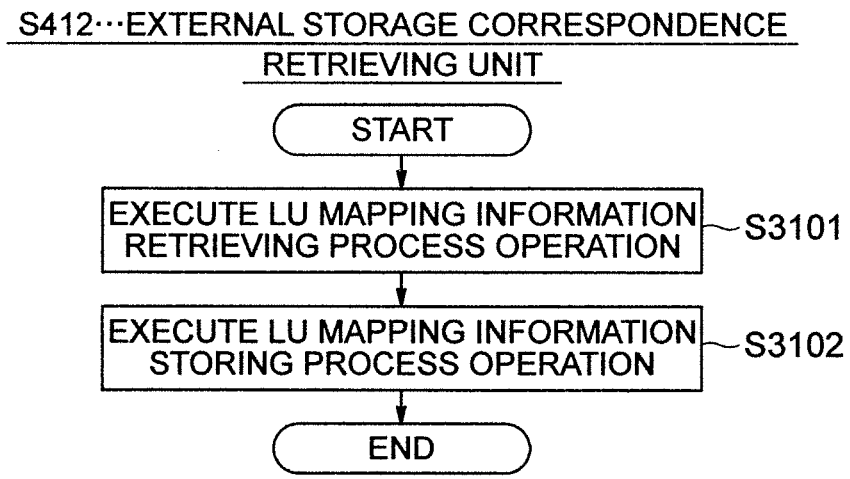
FIG. 31 is a flow chart for describing a process operation of an external storage correspondence retrieving unit.

FIG. 31 is a flow chart for describing a process operation of the external storage correspondence retrieving unit S412. In a step S3101, the external storage correspondence retrieving unit S412 retrieves mapping correspondence information (not shown in this drawing) of the external storage apparatus and LU from the resource structural information table 407. In a step S3102, both the LU and the mapping correspondence information of the external storage apparatus, which have been extracted in the retrieving process of the step S3101, are stored in the external storage correspondence table 413.

Figure 32:
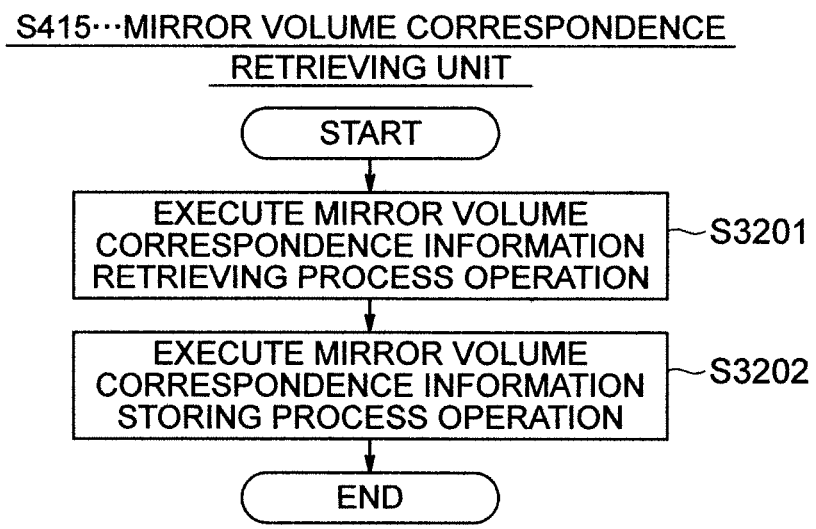
FIG. 32 is a flow chart for describing a process operation of a mirror volume correspondence retrieving unit.

FIG. 32 is a flow chart for indicating a process operation of the mirror volume correspondence retrieving unit S415. In a step S3201, the mirror volume correspondence retrieving unit S145 retrieves main/sub-volume correspondence information (not shown in the drawing) of LU from the resource structural information table 407. In a step S3202, the main/sub-volume correspondence information extracted in the retrieving process of the step S3201 is stored in the mirror volume correspondence table 416, and then, the process operation is accomplished.

FIG. 33 indicates a concrete example for showing an influence report screen displayed by the distribution influence display unit S411. The distribution influence display unit S411 displays the influence report screen on the display apparatus 104 of the storage managing client 102. On the influence report screen, the influences on the performance given to the I/O path caused by switching the system are displayed, while a change in distribution amounts of command multiplex numbers is employed as an index. FIG. 33 indicates an exemplification of the influence report screen when the executing system host has been switched from HOST 4 to HOST 5 in the cluster constituted by HOST 4 and HOST 5 of FIG. 2.

A message 3301 shows that the executing system has been switched from which host server to which host server; in the example, this message 3301 indicates that the executing system host has been switched from HOST 4 to HOST 5.

A message 3302 indicates that the path utilized by the cluster has been transferred from which path to which path by switching the system; in the example, the message 3302 represents that the path utilized by the cluster has been transferred from the I/O path connected to HBA (WWN 6) to the I/O path connected to HBA (WWN 7).

A table 3309 displays that how a distribution amount of command multiplex numbers (a total value of distribution amounts allocated to respective LUs in respective host servers) allocated to the respective host servers has been changed before and after the system is switched. It should also be noted that although the table 3309 has reported the distribution amounts coupled in the unit of a host server, the table 3309 may report distribution amounts coupled in the unit of an LU.

The table 3309 contains a number column 3303, a host server column 3304, a priority degree column 3305, a distribution column 3306 before system switching operation, a distribution column 3307, and an influence degree column 3308. A name of such a host server which receives an influence caused by the system switching operation is indicated in the host server column 3304. In the priority degree column 3305, business priority degrees of the respective host servers are expressed in a percentage, while a business priority degree of the entire system is selected to be 100%. The distribution column 3306 before the system switching operation indicates the distribution amount of the command multiplex numbers (namely, total amount of distribution amounts allocated to respective LUs in respective host servers) allocated to the respective host servers before the system was switched. The distribution column 3307 after the system switching operation indicates the distribution amount of the command multiplex numbers (namely, total amount of distribution amounts allocated to respective LUs in respective host servers) allocated to the respective host servers after the system was switched. In the influence degree column 3308, influence degrees calculated by the below-mentioned calculation formula are expressed in a percentage. The influence degree calculation is realized by the following formula (A4):

(increased amount of distribution amounts after system was switched)/(distribution amount before system is switched)×100   (A4).

It should also be understood that when a distribution amount described in "increased amount of distribution amounts after system was switched" is decreased, this distribution amount becomes a negative value.

In accordance with the above-described embodiment, the below-mentioned effects can be achieved. It should also be understood that the below-described effects (1) to (7) correspond to the problems (1) to (7) which should be solved by the present invention.

(1) The upper limit value of the command multiplex number every path can be automatically set, so that the deterioration of the I/O performance can be prevented.

(2) The command execution capability of the port of the storage apparatus can be utilized under maximum condition.

(3) The upper limit value can be automatically and instantaneously controlled in correspondence with the occurrence of the failure.

(4) The application program can be automatically controlled based upon the failure influence degree.

(5) The performance monitoring value of the relative volume can be effectively utilized.

(6) The upper limit values of the command multiplex numbers every path including the storage apparatuses having the different performance can be controlled in a batch manner.

(7) The port performance of the load-balanced path structures can be automatically tuned.

It should be further understood by those skilled in the art that although the foregoing description has been made on embodiments of the invention, the invention is not limited thereto and various changes and modifications may be made without departing from the spirit of the invention and the scope of the appended claims.

The invention claimed is:

1. A method for managing a storage system in which a host for executing an application program is communicatable with a storage via an SAN (Storage Area Network) and a managing server via a LAN (Local Area Network), and a monitoring server for monitoring said storage is communicatable with said storage via the SAN and said managing server via said LAN, said managing method managing access performance by which said storage is accessed from said host, wherein:

said host transmits both path information and a simultaneous command issue number to said managing server, said path information being equal to a plurality of paths where said host accesses a logical volume via at least the own host bus adapter, said SAN, and respective ports of said storage when said host executes said application program, and said simultaneous command issue number being equal to a total number of commands which are simultaneously issued in said respective of said plurality of paths;

said monitoring server transmits a command multiplex number upper limit value of each of the respective ports of said storage to said managing server, said command multiplex number upper limit value being equal to a total number of commands which can be simultaneously executed at the respective port of the storage;

when said managing server accepts said path information, said simultaneous command issue number, and said command multiplex number upper limit values of the respective ports, said managing server distributes said command multiplex number upper limit values of said respective ports to the respective paths which utilize said ports from said simultaneous command issue number so as to calculate a command multiplex upper limit value of each of the paths which utilize said ports, said command multiplex upper limit value of the respective path being based on both an amount for the command multiplex upper limit value determined for the respective path and registered in a table manner, and another amount of logical unit connected to each of the ports according to the path definition for each of the paths, and transmits said calculation result to said host; and said host sets the received command multiplex upper limit values of said respective paths with respect to said host bus adapter, wherein:

when said host senses that a simultaneous command issue number of each of the paths has reached said command multiplex number upper limit value of each of said paths to provide a sensed result, said host notifies said sensed result to said managing server; and said managing server notifies an instruction to said host, said instruction instructing that a command multiplex number which has not yet reached the command multiplex number upper limit value, or a command multiplex number which has been allocated to a path whose business priority degree is low is temporarily moved to said path.

2. A method for managing a storage system as claimed in claim 1, wherein:

in such a case that at least first, second, and third hosts have been coupled to each other so as to form a cluster, if a system/path switching operation occurs from the first host to the second host, then said managing server proportionally distributes the command multiplex number upper limit values of the respective ports to the respective paths which utilize said respective ports from said simultaneous command issue number based upon path information of said second host, a simultaneous command issue number of said second host, and a command multiplex upper limit value of a port of said second host so as to calculate command multiplex number upper limit values of said respective paths, and then, said managing server transmits the calculation result to the second host; and said second host sets the received command multiplex number upper limit values of said respective paths with respect to said host bus adapter.

3. A method for managing a storage system as claimed in claim 2, wherein:

when said system/path switching operation occurs, said managing server proportionally distributes the command multiplex number upper limit values of the respective ports to the respective paths which utilize said respective ports from said simultaneous command issue number based upon path information of said third host, a simultaneous command issue number of said third host, and a command multiplex upper limit value of a port of said third host so as to calculate command multiplex number upper limit values of said respective paths with respect to the third host which has already been connected to a switching destination port, and then, said managing server transmits the calculation result to said third host; and said third host sets the received command multiplex number upper limit values of said respective paths with respect to said host bus adapter.

4. A method for managing a storage system as claimed in claim 1, wherein:
in such a case that at least first, second, and third hosts have been coupled to each other so as to form a cluster, if a system/path switching operation occurs from the first host to the second host,
then said managing server proportionally distributes the command multiplex number upper limit values of the respective ports to the respective paths which utilize said respective ports from said simultaneous command issue number based upon instead of both path information of said second host and a simultaneous command issue number of said second host, a simultaneous command issue number of said first host and a command multiplex number upper limit value of said second host before said system/path switching operation so as to calculate command multiplex number upper limit values of said respective paths, and then, said managing server transmits the calculation result to the second host; and
said second host sets the received command multiplex number upper limit values of said respective paths with respect to said host bus adapter.

5. A method for managing a storage system as claimed in claim 1, wherein:
in such a case that at least first and second storages have been connected in a multi-stage connecting manner and the externally-connected second storage has been connected with respect to said first storage,
said monitoring server transmits a command multiplex number upper limit value of a port to said managing server, said command multiplex number upper limit value being equal to a total number of commands which can be simultaneously executed at a port of said second storage; and
said managing server sets said command multiplex number upper limit value of the port of said second storage as a command multiplex number upper limit value of a port of said first storage so as to calculate command multiplex number upper limit values with respect to the respective paths.

6. A method for managing a storage system as claimed in claim 1, wherein:
if said managing server judges that load-balanced and multiplexed paths are present based upon said path information,
then said managing server extracts such command multiplex number distribution amounts which have been allocated to the multiplexed paths among the command multiplex number distribution amounts allocated to the respective paths;
said managing server uniformly distributes a maximum distribution amount contained in said distribution amounts of said multiplexed paths to said multiplexed paths; and
said managing server again proportionally distributes the remaining command multiplex number distribution amount obtained as a result of said uniform distribution to other paths.

7. A storage system having a managing server in such a system that a plurality of hosts for executing an application program and a storage have been connected to an SAN (Storage Area Network), said managing server managing access performance from the respective hosts to said storage, wherein:
said managing server is comprised of a CPU comprising a memory, said memory comprised of:
information collecting code for collecting path information being equal to a plurality of paths where each of said hosts accesses a logical volume via at least the own host bus adapter and respective ports of said storage when each of said hosts executes said application program, a simultaneous command issue number being equal to a total number of commands which are simultaneously issued to said respective of said plurality of paths, and a command multiplex number upper limit value being equal to a total number of commands which can be simultaneously executed at each of the respective ports of the storage;
command multiple number distribution forming code for distributing said command multiplex number upper limit values of said respective ports to the respective paths which utilize said respective ports from said simultaneous command issue number based upon said path information, said simultaneous command issue number, and said command multiplex number upper value of said respective port so as to calculate a command multiplex upper limit value of each of said paths which utilize said ports, said command multiplex upper limit value of the respective path being based on both an amount for the command multiplex upper limit value determined for the respective path and registered in a table manner, and another amount of logical unit connected to each of the ports according to the path definition for each of the paths; and
host bus adapter updating code for transmitting update information with respect to said respective hosts, said update information updating the command multiplex number upper limit values of said respective paths,
wherein:
when said managing server accepts such a sensing information for sensing that a simultaneous command issue number of each of the paths has reached said command multiplex number upper limit value of each of said paths,
said managing server notifies an instruction to said host, said instruction instructing that a command multiplex number which has not yet reached the command multiplex number upper limit value, or a command multiplex number which has been allocated to a path whose business priority degree is low is temporarily moved to said path.

8. A storage system as claimed in claim 7, wherein:
in such a case that at least first, second, and third hosts have been coupled to each other to form a cluster and said managing server manages the cluster, when said managing server accepts a system/path switching instruction from the first host to the second host,
said command multiplex number distribution forming code proportionally distributes the command multiplex number upper limit values of the respective ports to the respective paths which utilize said port from said simultaneous command issue number based upon path information of said second host, a simultaneous command issue number of said second host, and a command multiplex upper limit value of a port of said second host so as to calculate command multiplex number upper limit values of said respective paths; and
said host bus adapter updating code transmits the update information for updating the command multiplex number upper limit values of said respective paths to said second host.

9. A storage system as claimed in claim 8, wherein:
when said managing server accepts said system/path switching instruction, said command multiplex number distribution forming code proportionally distributes the command multiplex number upper limit values of the respective ports to the respective paths which utilize said respective ports from said simultaneous command issue number based upon path information of said third host, a simultaneous command issue number of said third host, and a command multiplex upper limit value of a port of said third host so as to calculate command multiplex number upper limit values of said respective paths with respect to the third host which has already been connected to a switching destination port; and said host bus adapter updating code transmits the update information for updating the command multiplex number upper limit values of said respective paths to said third host.

10. A storage system as claimed in claim 7, wherein:

in such a case that said managing server has coupled at least first, second, and third hosts to each other so as to form a cluster and then has managed the cluster, when said managing server accepts a system/path switching instruction from the first host to the second host, said command multiplex number distribution forming code proportionally distributes the command multiplex number upper limit values of the respective ports to the respective paths which utilize said respective ports from said simultaneous command issue number based upon instead of both path information of said second host and a simultaneous command issue number of said second host, a simultaneous command issue number of said first host and a command multiplex number upper limit value of said second host before said system/path switching operation so as to calculate command multiplex number upper limit values of said respective paths; and said host bus adapter updating code transmits the update information for updating the command multiplex number upper limit values of said respective paths to said third host.

11. A storage system as claimed in claim 7, wherein:

in such a case that at least first and second storages have been connected in a multi-stage connecting manner and the externally-connected second storage has been connected with respect to said first storage, said information collecting code collects a command multiplex number upper limit value of a port, said command multiplex number upper limit value being equal to a total number of commands which can be simultaneously executed at a port of said second storage; and said command multiplex number distribution forming code sets said command multiplex number upper limit value of the port of said second storage as a command multiplex number upper limit value of a port of said first storage so as to calculate command multiplex number upper limit values with respect to the respective paths.

12. A storage system as claimed in claim 7, wherein:

if said command multiplex number distribution forming code judges that load-balanced and multiplexed paths are present based upon said path information, then said command multiplex number distribution forming code extracts such command multiplex number distribution amounts which have been allocated to the multiplexed paths among the command multiplex number distribution amounts allocated to the respective paths;

said command multiplex number distribution forming code uniformly distributes a maximum distribution amount contained in said distribution amounts of said multiplexed paths with respect to said multiplexed paths; and said command multiplex number distribution forming code again proportionally distributes the remaining command multiplex number distribution amount obtained as a result of said uniform distribution with respect to other paths.

13. A method for managing a storage system as claimed in claim 1, wherein:

in such a case that at least first and second storages have been connected in a multi-stage connecting manner and the externally-connected second storage has been connected with respect to said first storage, said monitoring server transmits a command multiplex number upper limit value of a port to said managing server, said command multiplex number upper limit value being equal to a total number of commands which can be simultaneously executed at a port of said second storage; and said managing server sets said command multiplex number upper limit value of the port of said second storage as a command multiplex number upper limit value of a port of said first storage so as to calculate command multiplex number upper limit values with respect to the respective paths.

14. A storage system as claimed in claim 7, wherein:

in such a case that at least first and second storages have been connected in a multi-stage connecting manner and the externally-connected second storage has been connected with respect to said first storage, said information collecting code collects a command multiplex number upper limit value of a port, said command multiplex number upper limit value being equal to a total number of commands which can be simultaneously executed at a port of said second storage; and said command multiplex number distribution forming code sets said command multiplex number upper limit value of the port of said second storage as a command multiplex number upper limit value of a port of said first storage so as to calculate command multiplex number upper limit values with respect to the respective paths.

\* \* \* \* \*